US008621054B2

(12) United States Patent
Maruyama et al.

(10) Patent No.: US 8,621,054 B2
(45) Date of Patent: Dec. 31, 2013

(54) COMPUTER-READABLE RECORDING MEDIUM STORING SOFTWARE UPDATE COMMAND PROGRAM, SOFTWARE UPDATE COMMAND METHOD, AND INFORMATION PROCESSING DEVICE

(75) Inventors: Tetsutaro Maruyama, Kawasaki (JP); Yoshihiro Tsuchiya, Kawasaki (JP); Masahisa Tamura, Kawasaki (JP); Hideki Sakurai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1142 days.

(21) Appl. No.: 12/560,037

(22) Filed: Sep. 15, 2009

(65) Prior Publication Data

US 2010/0198955 A1 Aug. 5, 2010

(30) Foreign Application Priority Data

Feb. 5, 2009 (JP) ................................. 2009-024552

(51) Int. Cl.
*G06F 15/16* (2006.01)
(52) U.S. Cl.
USPC ........... 709/223; 709/224; 709/246; 709/248; 717/172; 717/177
(58) Field of Classification Search
USPC .......... 709/223, 224, 226, 246, 248; 717/172, 717/176–177
See application file for complete search history.

(56) References Cited

U.S. PATENT DOCUMENTS

| 6,983,324 B1 * | 1/2006 | Block et al. | 709/228 |
|---|---|---|---|
| 8,151,257 B2 * | 4/2012 | Zachmann | 717/170 |
| 8,271,971 B2 * | 9/2012 | Thayer | 717/173 |
| 8,321,561 B2 * | 11/2012 | Fujita et al. | 709/224 |
| 8,321,858 B1 * | 11/2012 | Marmaros et al. | 717/173 |
| 2002/0042693 A1 * | 4/2002 | Kampe et al. | 702/186 |
| 2003/0126240 A1 * | 7/2003 | Vosseler | 709/221 |
| 2004/0216133 A1 * | 10/2004 | Roush | 719/316 |
| 2005/0108757 A1 * | 5/2005 | Lee et al. | 725/50 |
| 2007/0208782 A1 * | 9/2007 | Carter et al. | 707/201 |
| 2007/0294684 A1 * | 12/2007 | Kumashiro et al. | 717/168 |
| 2008/0040712 A1 * | 2/2008 | Tanaka | 717/168 |
| 2008/0115152 A1 * | 5/2008 | Welingkar et al. | 719/322 |
| 2008/0115226 A1 * | 5/2008 | Welingkar et al. | 726/28 |
| 2008/0162983 A1 * | 7/2008 | Baba et al. | 714/3 |
| 2008/0301668 A1 * | 12/2008 | Zachmann | 717/173 |
| 2009/0063667 A1 * | 3/2009 | Smith et al. | 709/222 |
| 2009/0187901 A1 * | 7/2009 | Kanai | 717/173 |
| 2009/0187970 A1 * | 7/2009 | Mower et al. | 726/3 |
| 2009/0328027 A1 * | 12/2009 | Tsuchiya et al. | 717/171 |
| 2010/0191848 A1 * | 7/2010 | Fujita et al. | 709/224 |

FOREIGN PATENT DOCUMENTS

| JP | 2002-304299 | 10/2002 |
|---|---|---|
| JP | 2004-364168 | 12/2004 |
| JP | 2005-85114 | 3/2005 |

* cited by examiner

*Primary Examiner* — Oanh Duong
(74) *Attorney, Agent, or Firm* — Staas & Halsey LLP

(57) ABSTRACT

An information processing device is provided that provides service by executing a service provider program in a cluster system. The device includes a program information transmission unit that transmits to a monitoring node that monitors the cluster system, a node list information reception unit that receives node list information, an update target selection unit that determines which of the other information processing devices which are not yet updated with the service provider program by referring to the program information in the node list information, a command timing determination unit that determines a time after a lapse of the standby time found in the first update timing information as a command timing of the update command, an update timing information generation unit that generates second update timing information and an update command transmission unit that transmits the update command about the service provider program and the second update timing information.

16 Claims, 19 Drawing Sheets

FIG.7

| DISTRIBUTION FREQUENCY | STANDBY FREQUENCY |
|---|---|
| 1 | 7 |
| 2 | 11 |
| 3 | 13 |
| 4 | 17 |
| 5 | 19 |
| 6 | 23 |
| 7 | 29 |
| 8 | 31 |

FIG.9

| IP ADDRESS | STATE | VER |
|---|---|---|
| 192.168.0.2 | NORMAL | 1.5 |
| 192.168.0.3 | NORMAL | 1.5 |
| 192.168.0.4 | NORMAL | 1.3 |
| 192.168.0.5 | NORMAL | 1.4 |

| IP ADDRESS | FREQUENCY |
|---|---|
| 192.168.0.3 | 10 TIMES/TIME |
| 192.168.0.4 | 30 TIMES/TIME |
| 192.168.0.5 | 20 TIMES/TIME |

| IP ADDRESS | STATE | VER |
|---|---|---|
| 192.168.1.2 | NORMAL | 1.4 |
| 192.168.1.3 | NORMAL | 1.5 |
| 192.168.1.4 | NORMAL | 1.4 |
| 192.168.1.5 | NORMAL | 1.4 |

| IP ADDRESS | STATE | VER |
|---|---|---|
| 192.168.0.2 | NORMAL | 1.5 |
| 192.168.0.3 | NORMAL | 1.5 |
| 192.168.0.4 | NORMAL | 1.3 |
| 192.168.0.5 | NORMAL | 1.4 |
| 192.168.1.2 | NORMAL | 1.4 |
| 192.168.1.3 | NORMAL | 1.5 |
| 192.168.1.4 | NORMAL | 1.4 |
| 192.168.1.5 | NORMAL | 1.4 |

850

COMPUTER-READABLE RECORDING MEDIUM STORING SOFTWARE UPDATE COMMAND PROGRAM, SOFTWARE UPDATE COMMAND METHOD, AND INFORMATION PROCESSING DEVICE

CROSS-REFERENCE TO RELATED APPLICATION(S)

This application is related to and claims priority to Japanese Patent Application No. 2009-024552, filed on Feb. 5, 2009, and incorporated herein by reference.

BACKGROUND

1. Field

The embodiments discussed herein are directed to a computer-readable recording medium storing a software update command program, a software update command method, an information processing device, and to a computer-readable recording medium storing a software update command program with which software update can be performed during operations, a software update command method, and an information processing device.

2. Description of Related Art

With a cluster system, a plurality of computers are used for decentralized processing. Such computers configuring the cluster system are referred to as nodes. In the cluster system, there needs to always recognize whether such nodes are operating normally or not to determine which of the nodes is to be assigned processing tasks.

For recognizing the state of service operations of the nodes in the cluster system, there is a method for providing heartbeats at regular intervals from the nodes to a monitoring node. The heartbeats are information indicating that the nodes providing the heartbeats are those operating normally. The monitoring node determines only any nodes providing the heartbeats at regular intervals as nodes operating normally.

When detecting any node not providing the heartbeats at regular intervals, the monitoring node determines that the node is suffering from a failure, and eliminates the node from a list of nodes to perform processing tasks. The node eliminated as such from the list of nodes to perform the processing tasks is freed from the cause of failure, and then is made available again for the service operations. When the service operations are resumed as such, the monitoring node adds the node back to the list of nodes to perform the processing tasks.

Note here that the information such as heartbeats to be provided at regular intervals can be more "real-time" with a shorter interval, but such a shorter interval causes the increase of communications load. In consideration thereof, there is a technology having been under study for changing the interval of periodic transmission based on the state of communications (Japanese Laid-open Patent Publication No. 2004-364168).

During the service operations in the cluster system, some need may arise for software update for any of the nodes. When such a need arises, generally, the node requiring software update is stopped in operation, and then the software update is accordingly started. As such, during the software update, the provision of service is temporarily stopped by the node. The issue here is that, when the provision of service is stopped as such, the monitoring node responsively detects it as a failure, and an error task is accordingly executed. However, the software update is not an error, and once the software update is completed, it is evident that the service operations are normally started with no issue. Therefore, if the error task is executed as such, it can mean that the task execution is needless, thereby causing the reduction of operation efficiency.

To overcome such a issue, systems have been proposed for a software update without causing the provision of service to stop. For example, a cluster system can use an agent for provision of service, and a cluster control section for controlling the agent while communicating with other computers in the cluster system. The cluster system of such a configuration performs software upgrade in the cluster control section while the agent is continuously providing the service (Japanese Laid-open Patent Publication No. 2005-085114).

Also proposed is a method for collectively installing a cluster system configured by a plurality of nodes with a master node keeping information about system installment, and issues an activation command to slave nodes while performing the system installment to itself. After the slave nodes are activated, such system installment is repeatedly performed to all of the slave nodes of high- to low-order, thereby installing the cluster system in its entirety (Japanese Laid-open Patent Publication No. 2002-304299).

SUMMARY

It is an aspect of the embodiments discussed herein to provide an information processing device that provides service by executing a service provider program in a cluster system. An exemplary embodiment of this device includes a program information transmission unit that transmits, at predetermined transmission interval, to a monitoring node that monitors the cluster system, program information about the service provider program being executed by the computer, a node list information reception unit that receives, from the monitoring node, node list information including the program information about other information processing devices in the cluster system, an update target selection unit that determines which of the other information processing devices which are not yet updated with the service provider program by referring to the program information in the node list information, and selecting, as an update target information processing device, at least a part of the other information processing devices not yet updated with the service provider program, a command timing determination unit that determines, in response to an input of first update timing information indicating a standby time until the update command is transferred together with the update command with respect to the service provider program being executed by the computer, a time after a lapse of the standby time found in the first update timing information as a command timing of the update command, an update timing information generation unit that generates second update timing information indicating a standby time until the update command is transferred from the update target information processing device to any of the other information processing devices and an update command transmission unit that, when the command timing comes, transmits the update command about the service provider program and the second update timing information to the update target information processing device.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 7 illustrates an exemplary update timing information table;

FIG. 9 illustrates an exemplary node list table;

FIG. 16 illustrates an exemplary communications amount table for use with evaluation of dual strength;

FIG. 18 illustrates an exemplary is a node list table; and

FIG. 19 illustrates an exemplary overall node list table.

DESCRIPTION OF THE EMBODIMENTS

During a software update task, nodes may become unstable in operation. Therefore, if pluralities of nodes are put in the software update task all at once, such a state may make a cluster system unstable in its entirety.

When a software update is performed, for example, to every node in a cluster system that is large in size, such software update possibly causes the reduction of operation efficiency and reliability in the entire system. An aspect of an exemplary embodiment provides a software update command program, a software update command method, and an information processing device with which software update can be performed to a large number of nodes without causing the reduction of reliability of service provided by a cluster system.

Figure 1:
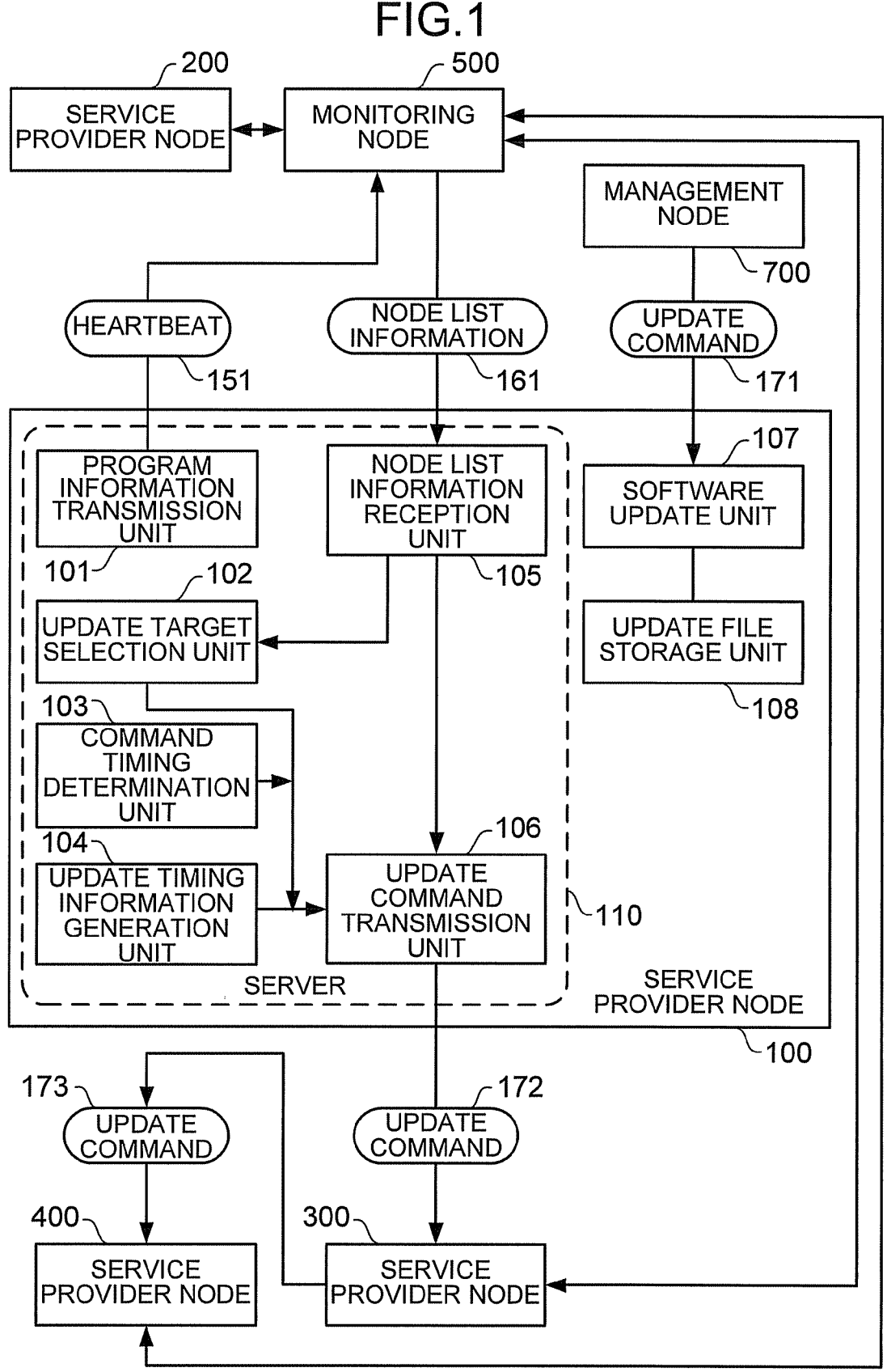
FIG. 1 illustrates an exemplary embodiment.

FIG. 1 a service provider node 100 that can configure a cluster system together with service provider nodes 200, 300, and 400, and provides a service by decentralized processing in response to a service request coming from a processing request node (not shown). The service provider nodes 100, 200, 300, and 400 each transmit a heartbeat 151 to a monitoring node 500, and are each provided with node list information 161 as a recognition response to the heartbeat 151. The service provider node 100 is provided with an update command 171 from a management node 700.

The service provider node 100 is configured to include a program information transmission unit 101, an update target selection unit 102, a command timing determination unit 103, an update timing information generation unit 104, a node list information reception unit 105, an update command transmission unit 106, a software update unit 107, and an update file storage unit 108.

The service provider node 100 may operate as a server providing a service, and implemented by the operation of a server 110. The server 110 may be implemented by the service provider node 100 running a service provider program.

FIG. 1 illustrates, for example, the service provider program includes a software update command program for transferring an update command from the service provider program. The server 110 is thus provided with transferring an update command from the service provider program.

The server 110, as illustrated in FIG. 1 may also transfer an update command from the service provider program. That is, the server 110 may be configured to include the program information transmission unit 101, the update target selection unit 102, the command timing determination unit 103, and the update timing information generation unit 104, the node list information reception unit 105, and the update command transmission unit 106. Alternatively, the server 110 may be configured to include also the software update unit 107, and the update file storage unit 108.

The program information transmission unit 101 transmits, at regular intervals, the heartbeat 151 to the monitoring node 500 to inform it of the operating status of the service provider node 100. The heartbeat 151 includes version information about the software version of the server program, i.e., program information. With such information, the monitoring node 500 can know not only the operation status of the service provider node 100 but also the software version of the program, i.e., server program, implementing the server function. The monitoring node 500 includes with the heartbeat not only from the service provider node 100 but also from the service provider nodes 200, 300, and 400, thereby generating the node list information 161. The node list information 161 is data of a list including the network address(es), i.e., address information, of the service provider node(s) under the monitoring of the monitoring node 500, and the software version of the server program, i.e., program information.

The node list information reception unit 105 includes with such node list information 161 from the monitoring node 500. As such, the service provider node 100 acquires the program information and the address information about any other service provider node(s) configuring the cluster system.

The update target selection unit 102 is operated to make a comparison in terms of software version, and selects the service provider node 300 as another target for program update. Such a selection of a target for program update is made by a search of the node list information 161 to find any service provider node whose software version is earlier than that of its own.

The command timing determination unit 103 is operated to determine the timing to ask the service provider node 300 for software update. For example, using update timing information provided together with an update command 171, the command timing determination unit 103 determines such a timing to ask for software update. The update timing information indicates a standby time before transferring of the update command. By using the update timing information as such, the command timing determination unit 103 can set the command timing for software update with the lapse of the standby time found in the update timing information after the input of the update command 171.

The update timing information generation unit 104 is operated to generate (acquire) another update timing information for use by the service provider node 300 to determine the timing to ask still another service provider node for software update, i.e., in FIG. 1 example, the service provider node 400. The timing to ask for software update is selected not to synchronize with the timing determined by the command timing determination unit 103, i.e., not to have the same timing cycle thereas.

As such, a time lag is caused between the timing for the service provider node 100 to allow asking the service provider node 300 for software update and the timing for the service provider node 300 to allow asking ask still another service provider node for software update.

The update command transmission unit 106 is operated to transmit, to the service provider node 300 selected as a target for software update, an update command 172 at the timing determined by the command timing determination unit 103. The update command 172 is the one including both an update command and update timing information.

The service provider node 300 transmits an update command 173 to the service provider node 400 selected as still another target for software update. As such, by transferring an update command with a time lag, the service provider nodes configuring the cluster system can perform software update at various different timings. Since a large number of nodes no longer perform software update, the cluster system will remain stable. Especially when a large number of nodes are put in the task of software update in the cluster system large in size, the operation efficiency and reliability of the entire system will not be reduced. Moreover, any burden of software update for a manager of the cluster system can be reduced or eliminated. Herein, such a burden includes scheduling for update, managing of update task, checking of update result, and others.

The management node 700 provides a first update command, i.e., update command 171, to any one of the service provider nodes configuring the cluster system. The first update command 171 may be issued by a manager of the system, or may be programmed or scheduled in advance. Only by providing such a first update command 171 to one of the service provider nodes, the update command is distributed to the remaining service provider nodes configuring the cluster system, and software update is performed automatically to all of the service provider nodes. The software update unit 107 is operated to activate the update program in response to such an update command 171. The update command 171 may include an update file, and if this is the case, the update file is stored in the update file storage unit 108. When the update file is the one initially scheduled for update, the update file may be stored in advance in the update file storage unit 108. Alternatively, the update file may be distributed during the operation of general service provision.

The program information transmission unit 101 may transmit a heartbeat to the monitoring node 500 with program information. Alternatively, the program information transmission unit 101 may transmit the program information at regular intervals. Moreover, the program information is not restricted to be transmitted voluntarily by the service provider node, and may be transmitted as a polling response coming from the monitoring node 500 at regular intervals.

Figure 2:
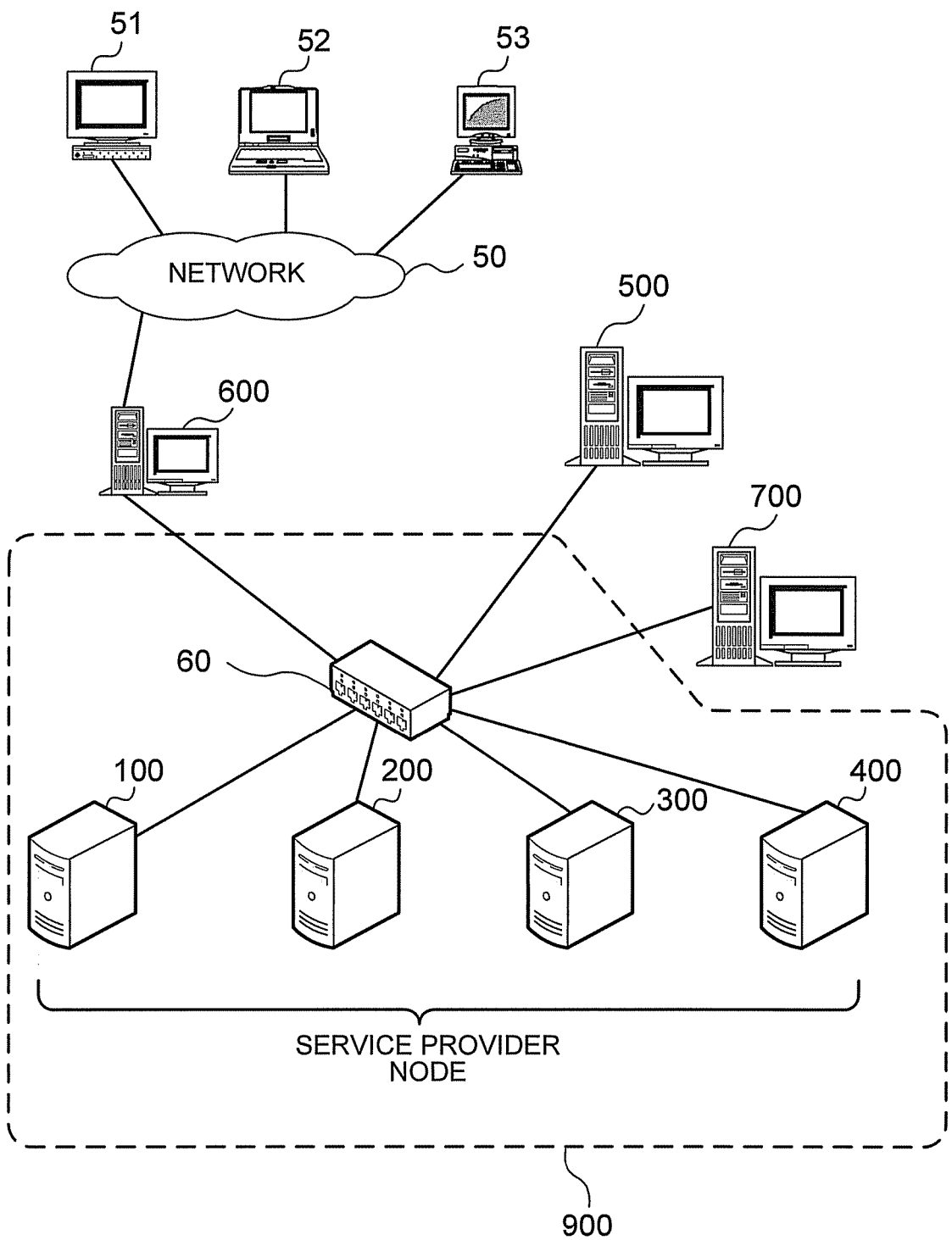
FIG. 2 illustrates an exemplary cluster system.

FIG. 2 illustrates an exemplary configuration of a cluster system with a connection established among, via a switch 60, a plurality of service provider nodes 100, 200, 300, and 400, the monitoring node 500, a processing request node 600, and the management node 700.

The service provider nodes 100, 200, 300, and 400 are each a computer using architecture called IA (Intel Architecture), for example. The service provider nodes 100, 200, 300, and 400 each execute data processing in accordance with a processing request based on application software. Such a data processing service may be referred to as server. The server incorporated in each of the service provider nodes 100, 200, 300, and 400 is capable of transmitting heartbeats to the monitoring node 500 at regular intervals.

The transmission interval of the heartbeats can be arbitrarily changed. When the transmission interval of the heartbeats is changed, information indicating the new interval of the heartbeats includes from the service provider nodes 100, 200, 300, and 400 to the monitoring node 500.

The monitoring node 500 controls the service provider nodes 100, 200, 300, and 400. For example, the monitoring node 500 knows which of the service provider nodes 100, 200, 300, and 400 are in normal operation by receiving the heartbeats provided respectively therefrom. That is, in accordance with the information provided respectively from the service provider nodes 100, 200, 300, and 400 indicating the transmission interval of heartbeats, the monitoring node 500 waits for the heartbeats at intervals varying among the service provider nodes 100, 200, 300, and 400. When there is any service provider node not providing the heartbeats at designated intervals, the monitoring node 500 determines that the service provider node is in failure.

The processing request node 600 is connected with a plurality of terminal devices 51, 52, and 53 over a network 50. The processing request node 600 acknowledges the storage location of data, each under the management of the service provider nodes 100, 200, 300, and 400. The processing request node 600 makes a data access to the service provider nodes 100, 200, 300, and 400 in response to requests coming from the terminal devices 51, 52, and 53.

The management node 700 is a computer for managing the system in its entirety. The management node 700 forwards, in response to an operation input by a manager, an update request to any of the service provider nodes 100, 200, 300, and 400 for update of server software, for example.

Figure 3:
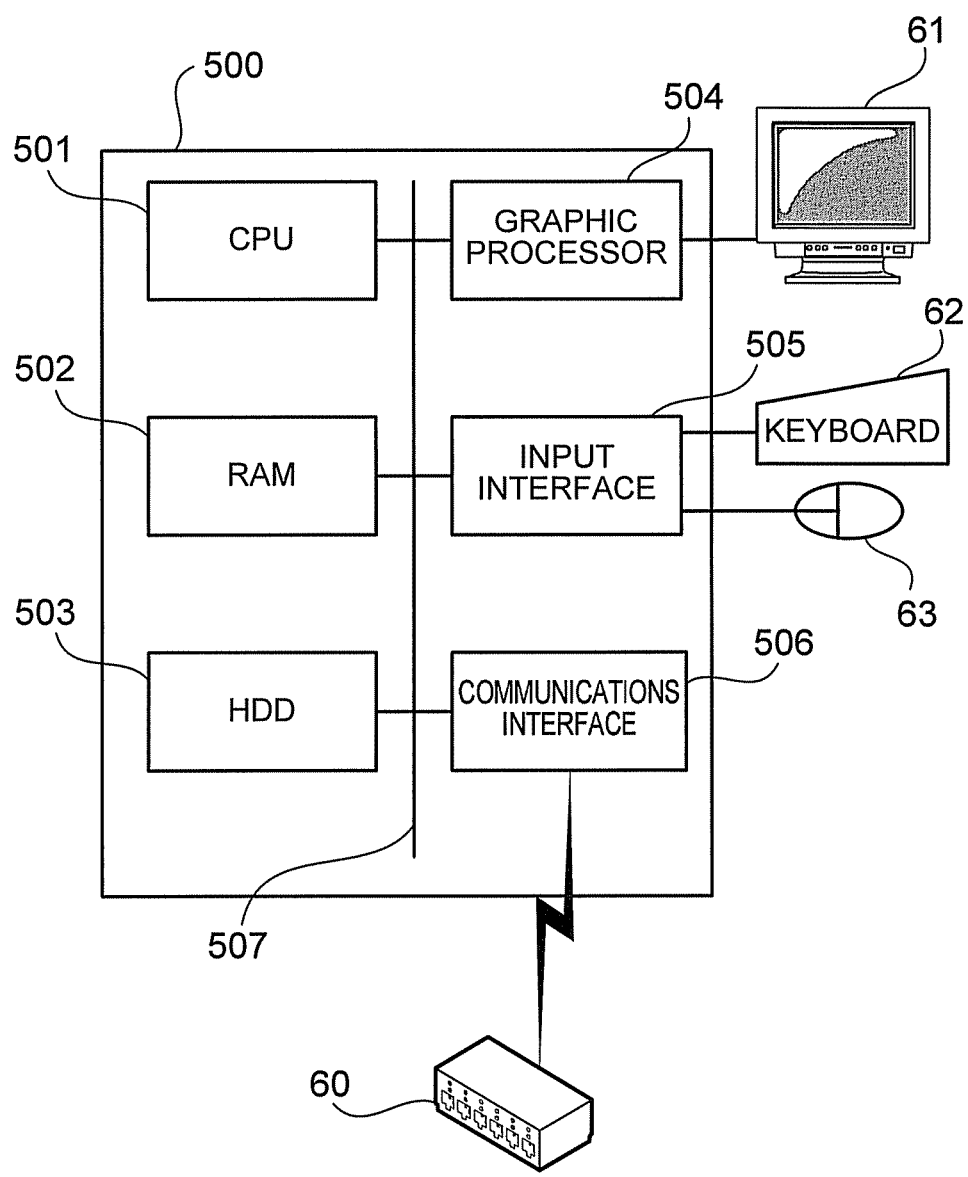
FIG. 3 illustrates an exemplary hardware configuration of a monitoring node.

FIG. 3 illustrates an exemplary hardware configuration of the monitoring node for use in the embodiment. The monitoring node 500 may be entirely under the control of a CPU (Central Processing Module) 501. The CPU 501 is connected with, over a bus 507, a RAM (Random Access Memory) 502, a hard disk drive (HDD) 503, a graphic processor 504, an input interface 505, and a communications interface 506.

The RAM 502 temporarily stores therein at least partially an OS (Operating System) program to be run by the CPU 501, and an application program for server execution. The RAM 502 stores therein various types of data needed for processing by the CPU 501. The HDD 503 stores therein the OS and application programs.

The graphic processor 504 is connected with a monitor 61. The graphic processor 504 displays images on the screen of the monitor 61 in accordance with a command coming from the CPU 501. The input interface 505 is connected with a keyboard 62 and a mouse 63. The input interface 505 forwards signals coming from the keyboard 62 and the mouse 63 to the CPU 501 over the bus 507.

The communications interface 506 is connected to the switch 60. The communications interface 506 performs data transmission and reception to/from other computers via the switch 60. With such a hardware configuration, the processing functions of the embodiment can be implemented. Note here that FIG. 3 shows an exemplary hardware configuration of the monitoring node, and the similar hardware configuration can implement other components, i.e., the service provider nodes 100, 200, 300, and 400, the processing request node 600, the management node 700, and the terminal devices 51, 52, and 53.

Figure 4:
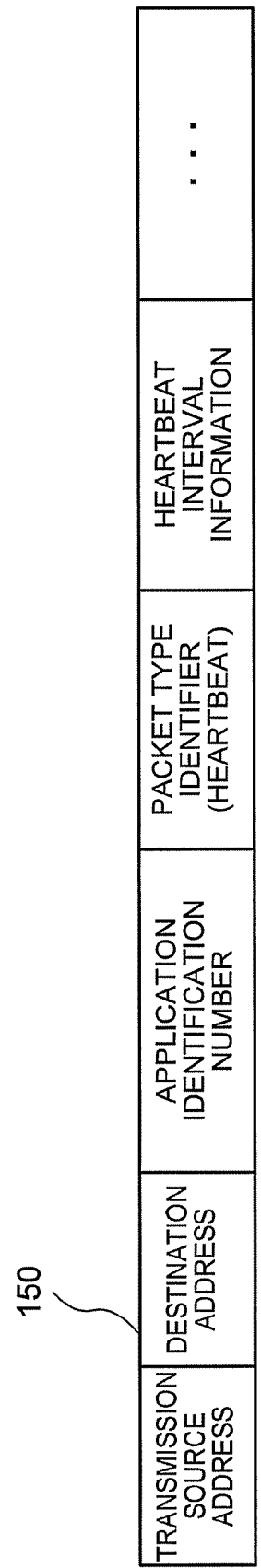
FIG. 4 illustrates an exemplary data configuration of a heartbeat packet.

FIG. 4 illustrates an exemplary data configuration of a heartbeat packet. A heartbeat packet 150 includes with fields of "transmission source address", "destination address", "application identification number", "packet type identifier", "heartbeat interval information", and others.

The field of "transmission source address" indicates an address set to uniquely identify, on the network, from which service provider node the heartbeat packet 150 is transmitted.

As an example, the transmission source address is the IP (Internet Protocol) address of the service provider node.

The field of "destination address" indicates an address set to uniquely identify, on the network, to which monitoring node 500 the heartbeat packet 150 is to be directed. As an example, the destination address is the IP address of the monitoring node 500.

The fields of "transmission source address" and "destination address" are included in header information of the heartbeat packet 150. The field of "application identification number" indicates an identification number set for the monitoring node 500 to uniquely identify the software version of the server program of the server 110 providing the heartbeats. This identification number allows unique identification of, through a comparison between any two arbitrary identification numbers, which of the versions is earlier. The identification number may serve well as long as it helps to determine the necessity of version update through a comparison of any two arbitrary identification numbers.

The field of "packet type identifier" indicates an identifier representing that the heartbeat packet 150 is a packet notifying the heartbeats. The field of "heartbeat interval information" indicates a value representing a time in seconds for the transmission interval of the heartbeats.

Figure 13:
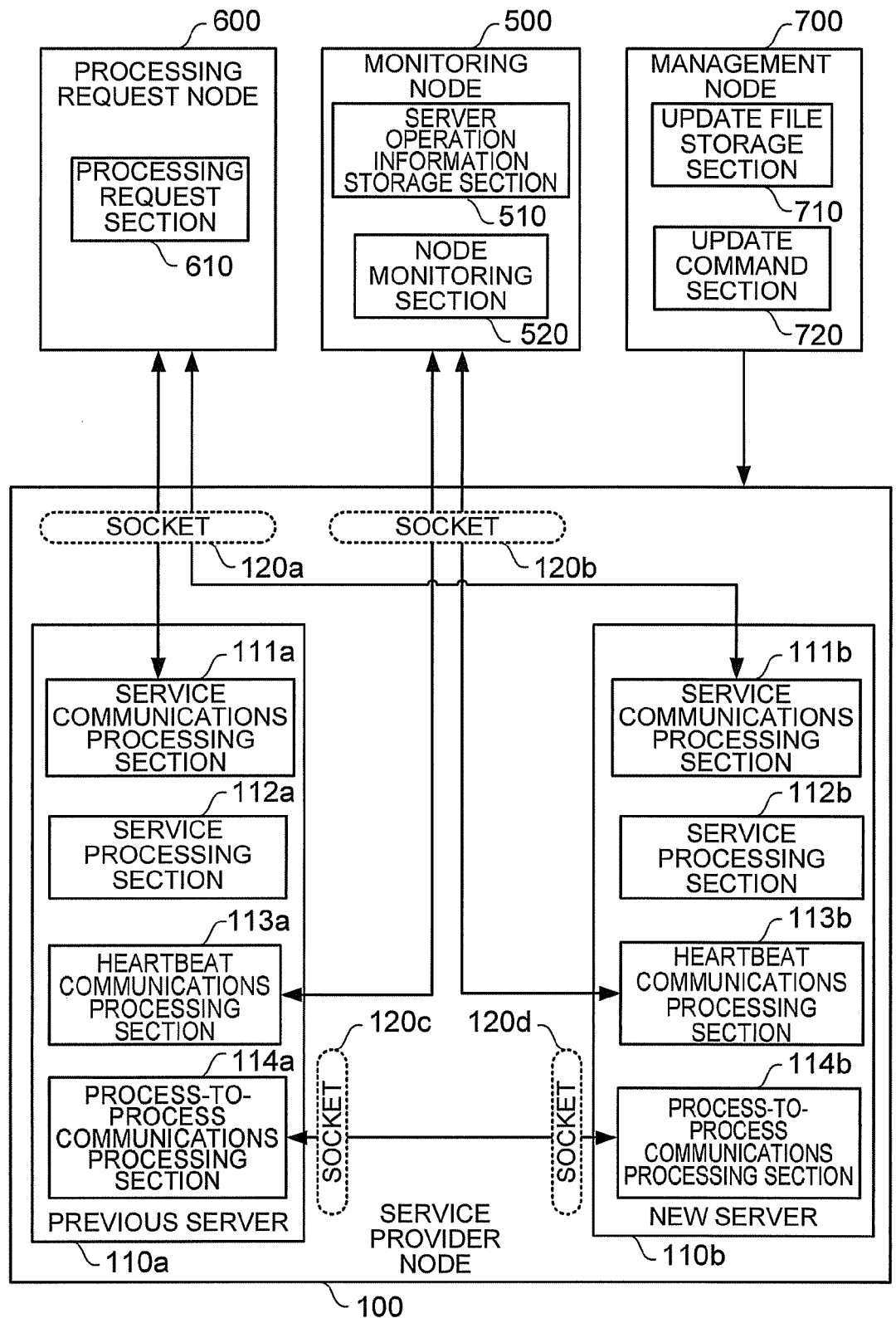
FIG. 13 illustrates an exemplary function block diagram of a decentralized processing system.

When receiving such a heartbeat packet 150, based on the heartbeats, the monitoring node 500 enters the operation status of each of the servers into a server operation information table in the server operation information storage section 510 (FIG. 13).

Figure 5:
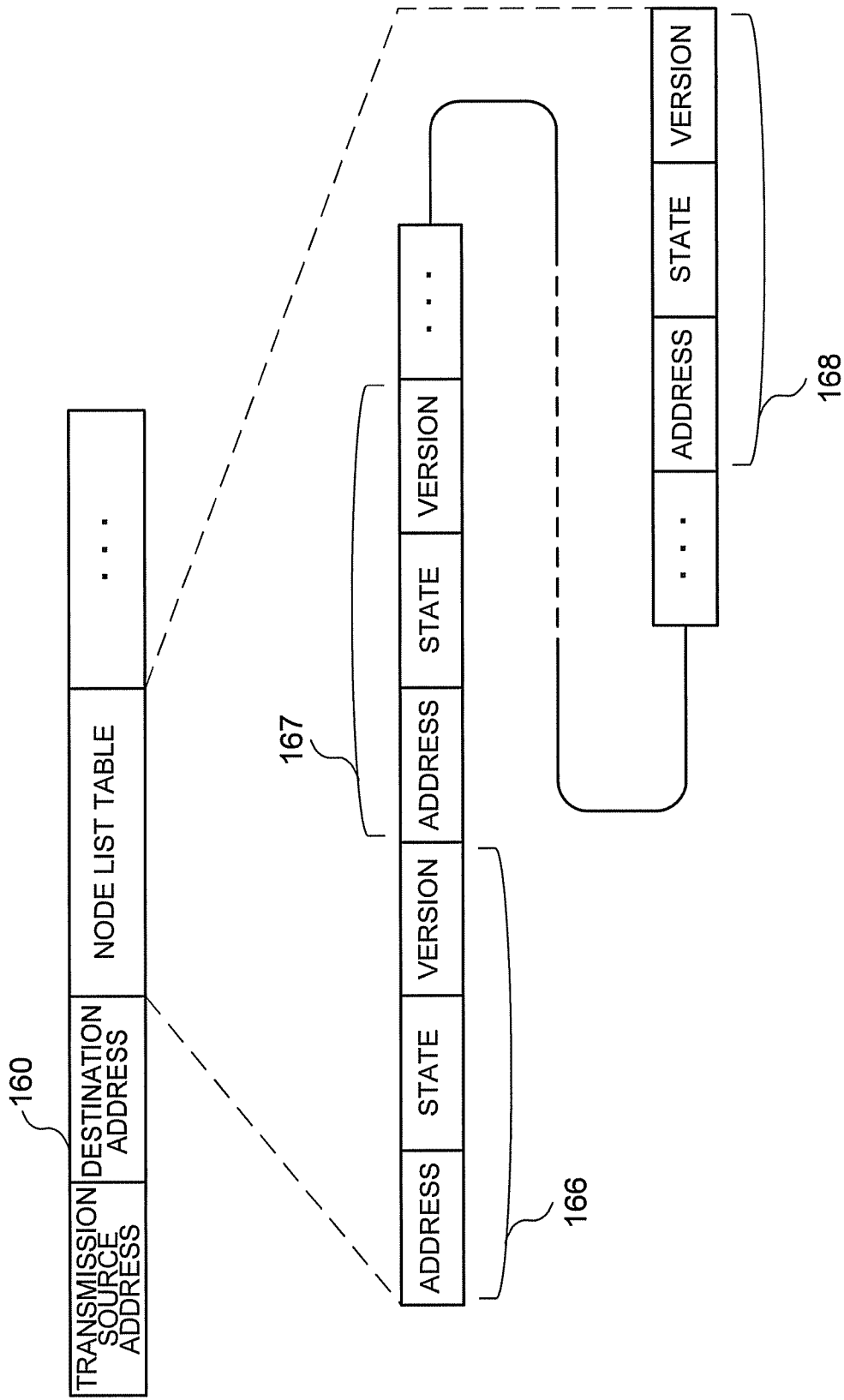
FIG. 5 illustrates an exemplary data configuration of a heartbeat recognition response packet.

FIG. 5 illustrates an exemplary data configuration of a heartbeat recognition response packet. A heartbeat recognition response packet 160 is provided with fields of "transmission source address", "destination address", "node list", and others.

The field of "transmission source address" indicates an address set to uniquely identify, on a network, the monitoring node 500 being the transmission source of the heartbeat recognition response packet 160. For example, the transmission source address is the IP address of the monitoring node 500.

The field of "destination address" indicates an address set to uniquely identify, on the network, which of the service provider nodes is the destination of the heartbeat recognition response packet 160. For example, the destination address is the IP address of the service provider node.

The fields of "transmission source address" and "destination address" are included in header information of the heartbeat recognition response packet 160. The field of "node list" includes field sets 166, 167, and 168 for each service provider node being a target for monitoring by the monitoring node 500. Such a field set is provided as many as the service provider nodes each being a target for monitoring. These field sets 166, 167, and 168 respectively provided to the service provider nodes as such are each configured by subfields of address, state, version, and others.

The subfield of "address" indicates an address set to uniquely identify, on the network, which service provider node, e.g., IP address of the service provider node. The subfield of "state" indicates the state of any corresponding service provider node based on the reception status of the heartbeat packet 150 therein. When the heartbeat packet 150 is recognized as being received at regular intervals, the state of "normal" is set. On the other hand, when the heartbeat packet 150 is recognized as not being received at regular intervals, the state of "abnormal" is set.

The subfield of "version" indicates an application identification number, or information set for a comparison of versions by the monitoring node 500 based on the application identification number. Similarly to the application identification number, such information also allows unique identification of which version is earlier through a comparison of versions between any arbitrary two information pieces. Herein, such information for a comparison of versions may serve well as long as it helps to determine the necessity of version update by comparing any arbitrary two information pieces for a comparison of versions.

The size of the node list, i.e., the number of areas corresponding to the number of nodes, may be allowed to be kept track by provision of information about the number of nodes configuring the node list to the field of "node list". Alternatively, any other method will also do to keep track of the size of the node list, e.g., the node list may be fixed in size, or end-of-node information may be additionally provided.

After receiving such a heartbeat recognition response packet 160, the service provider node keeps a node list table 810 (FIG. 9) being the latest to make it available for the update target selection unit 102 to refer to the node list.

Figure 6:
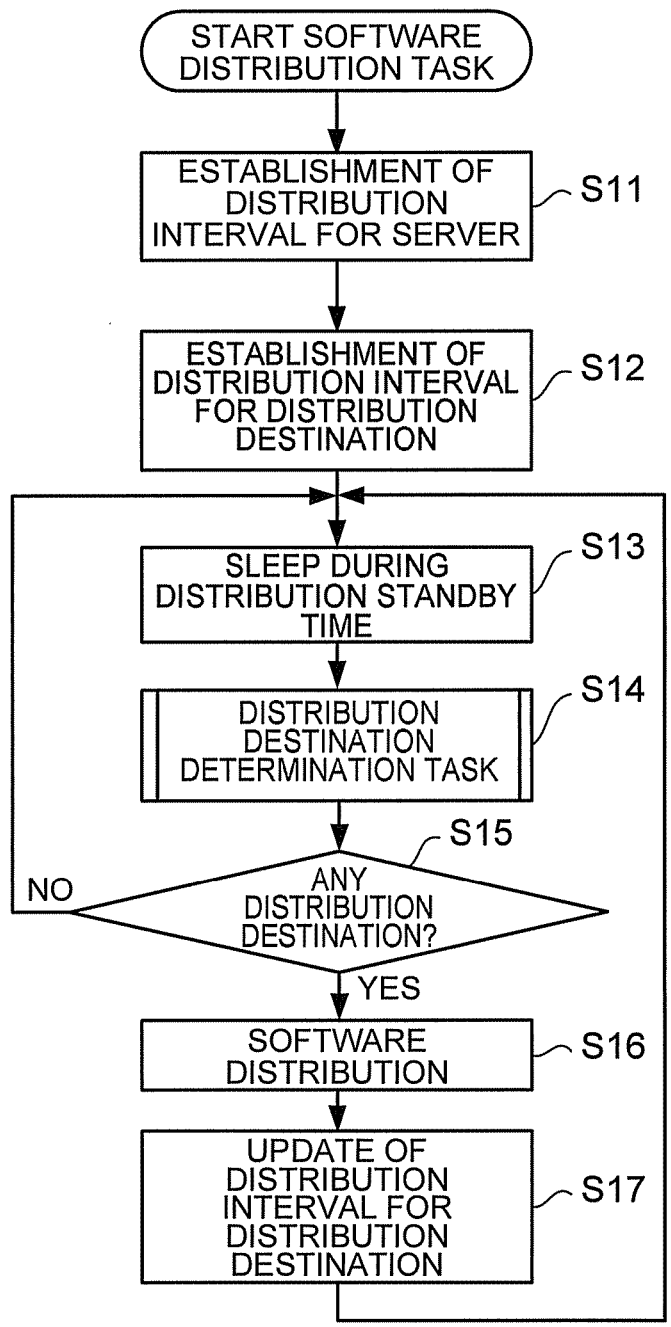
FIG. 6 illustrates a software distribution task.

FIG. 6 illustrates a software distribution task. A software (update program) distribution task may be executed by the server 110 after the completion of software update for its own. FIG. 7 illustrates an exemplary update timing information table. FIG. 6 is described in using operation numbers.

In FIG. 6, in Operation S11 a command timing determination unit 103 of the server 110 establishes an interval of software distribution for its own, i.e., distribution source. For establishing such a distribution interval, an update timing information table 800 is referred to. When software update is performed in response to the update command 171 provided by the management node 700, the command timing determination unit 103 refers to a field of "distribution frequency" of a line indicating the number of 1, thereby finding a field of "standby frequency" of a line indicating the number of 7. The value being a result of multiplication between the value of heartbeat transmission interval and the value of standby frequency is used as the software distribution interval for its own. Assuming that the heartbeat transmission interval is 10 seconds, and the value of standby frequency is 7, the software distribution interval for the server 110 is 70 seconds.

The values in the field of "distribution frequency" in the update timing information table 800 are designated, as a rule, by the distribution source.

Operation S12: The update timing information generation unit 104 of the server 110 establishes the interval of software distribution for a service provider node selected as a target for update. For establishing such a distribution interval this time, the update timing information table 800 is referred to also with the software distribution frequency for its own. When the software distribution frequency for its own indicates a value of 1, the update timing information generation unit 104 refers to a line of the field of "distribution frequency" indicating a value of 2, which is a result of adding 1 to the value of 1 of the distribution frequency for its own, thereby finding a value of 11 in the field of "standby frequency". The update timing information generation unit 104 then sets the value of 11 found in the field of "standby frequency" to the software distribution interval for the service provider node, i.e., distribution destination, selected as an update target.

Operation S13: The update command transmission unit 106 of the server 110 is put in the standby state, i.e., sleep, until the software distribution interval, i.e., distribution standby time, determined in operation S11 comes.

Operation S14: The update target selection unit 102 of the server 110 determines a destination of software distribution. This distribution destination determination task is described in detail later by referring to FIG. 8.

Operation S15: When the update command transmission unit 106 of the server 110 finds no distribution destination in the distribution destination determination task in operation S14, the procedure returns to operation S13. When the update command transmission unit 106 finds any distribution destination, the procedure goes to operation S16.

Operation S16: The update command transmission unit 106 of the server 110 provides software to the distribution destination determined in the distribution destination determination task in operation S14, and then issues a command thereto for update of the software. A software distribution may be made in advance, and if this is the case, only a software command may be issued with no distribution of software. The address of the distribution destination of the software is acquired by referring to the node list table 810.

Operation S17: The update timing information generation unit 104 of the server 110 establishes another software distribution interval for any of the remaining service provider nodes to be selected next as an update target. For establishing such a distribution interval this time, the update timing information table 800 is referred to also with the software distribution frequency established for the service provider node in operation 812. When the software distribution frequency established in operation 812 for the service provider node is 2, the update timing information generation unit 104 refers to a line of the field of "distribution frequency" indicating a value of 3, which is a result of adding 1 to the value of 2 of the software distribution frequency established in operation S12 for the service provider node, thereby finding a value of 13 in the field of "standby frequency". The update timing information generation unit 104 then sets the value of 13 found in the field of "standby frequency" to the software distribution interval of the other service provider node, i.e., distribution destination, selected this time for an update target. The procedure then returns to operation S12.

The value of the distribution frequency is incremented by 1 with every software distribution to any of the service provider nodes selected as an update target so that the standby frequency can vary by every software distribution.

The update timing information table 800 shows a correlation between the distribution frequency and the standby frequency. The standby frequency varies depending on the distribution frequency. The values of the standby frequency are so arranged as to show a monotonic increase in value with the increasing distribution frequency. The standby frequency takes prime numbers, and an initial value thereof, i.e., the standby frequency corresponding to the distribution frequency of 1, is set to 7 not to be too small.

Although the field of "standby frequency" shows prime numbers in ascending order, this is surely not restrictive, and any other value arrangement will also do. The service provider nodes through with software update as such each issue a software update command to other service provider nodes at various timings. The service provider nodes through with software update each also issue a command for other service provider nodes to issue a software update command at various different timings. As a result, the software update command coming from any of the service provider nodes configuring the cluster system is transferred in the cluster system at various timings. Accordingly, in such a cluster system, because a large number of nodes do not perform software update all at once any more, the system can be stable even during software update. When the software update is performed to a large number of nodes in the cluster system large in size, there is hardly or no possibility of reducing the operation efficiency and reliability of the entire system.

Figure 8:
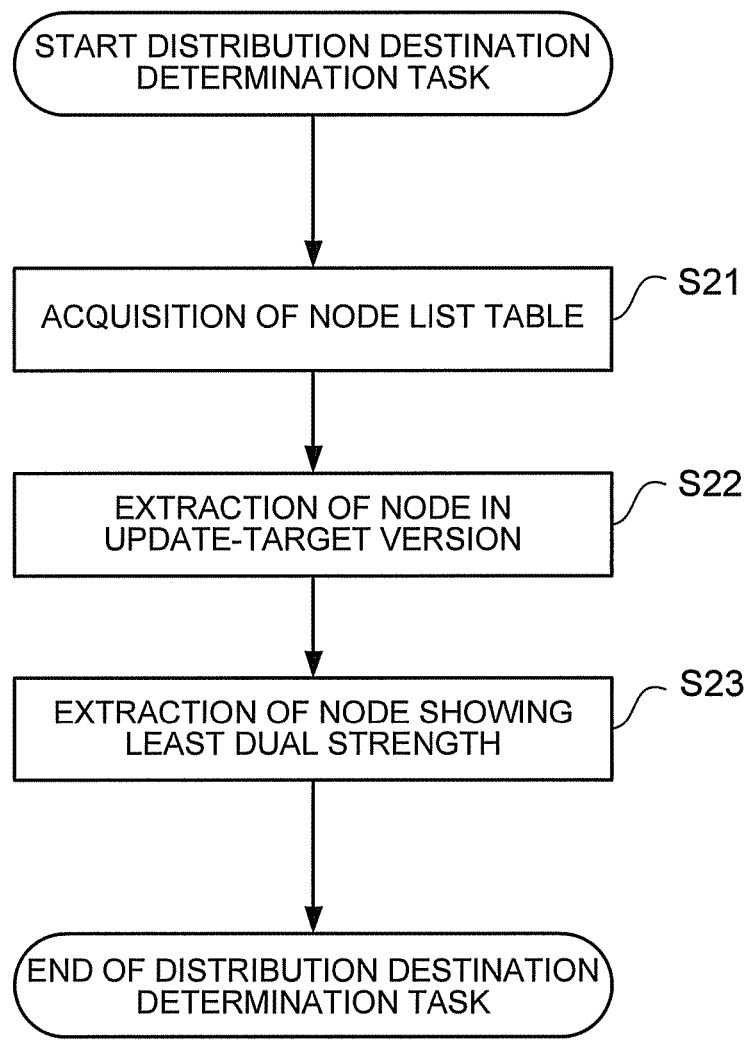
FIG. 8 illustrates a distribution destination determination task.

FIG. 8 illustrates the distribution destination determination task. The distribution destination determination task is executed in operation S14 of the software distribution task. FIG. 9 is a node list table. The task of FIG. 8 executed by the update target selection unit 102 of the server 110.

Operation S21: The update target selection unit 102 of the server 110 acquires the node list table 810. The node list table 810 is generated based on the field of "node list" of the heartbeat recognition response packet 160. The node list table 810 includes an element set as many as the service provider nodes each being a monitoring target of the monitoring node 500. The element set includes fields of "IP address, "state" and "VER" (version).

The node list table 810 of FIG. 9 example shows that the service provider node with the IP address of 192.168.0.2 is in the state of "normal", and is being activated by software VER 1.5. The table also shows that the service provider node with the IP address of 192.168.0.3 is also in the state of "normal", and is being activated also by software VER 1.5. The table also shows that the service provider node with the IP address of 192.168.0.4 is also in the state of "normal", and is being activated by software VER 1.3. The table also shows that the service provider node with the IP address of 192.168.0.5 is also in the state of "normal", and is being activated by software VER 1.4.

Operation S22: The update target selection unit 102 of the server 110 refers to the node list table 810, and extracts any of the service provider nodes in the version of update target. Any of the service provider nodes showing the state of "normal" are extracted. Any service provider node in the state of "abnormal" is not a target for software update. Next, the extracted service provider nodes confirm their software version. Such a version check tells that the service provider node with the IP address of 192.168.0.2 is in VER 1.5. As such, extracted are the service provider node with the IP address of 192.168.0.4 in VER 1.3 and that with the IP address of 192.168.0.5 in VER 1.4.

For such a version check, referring to the node list table 810 is surely not restrictive, and an application identification number may be also used. Even if using the application identification number is not easy to make a version comparison to tell which version is earlier, the monitoring node may convert the application identification number into VER that allows an easy version comparison, and the resulting VER may be provided to each of the service provider nodes.

Operation S23: The update target selection unit 102 of the server 110 selects either of the two service provider nodes extracted in operation S22 whichever is showing a lower value for the dual strength. When these service provider nodes show the same value for the duel strength, either of these nodes is selected at random or by any other method. The reason of selecting the service provider node showing a lower value for the dual strength is that software update in the service provider node showing the lower relation strength in a specific unit time is desirable for the increase of the stability of the system.

The update target selection unit 102 then extracts the service provider node selected as such for use as a distribution destination, or ends the task if no such service provider node is found for use as a distribution destination.

The dual strength denotes the strength of a tie, i.e., relationship, between any two service provider nodes. Especially, data is first segmented and then is made redundant, i.e., primary segment data and secondary segment data for improving the reliability, thereby representing the strength of relationship in the system performing decentralized processing using a plurality of service provider nodes.

Herein, for evaluating such a dual strength, the size or number of the data made redundant as primary segment data and the secondary segment data may be used as a basis. Alternatively, for evaluating the dual strength, the amount of previous communications during a fixed length of time for each communications end may be used.

Figure 10:
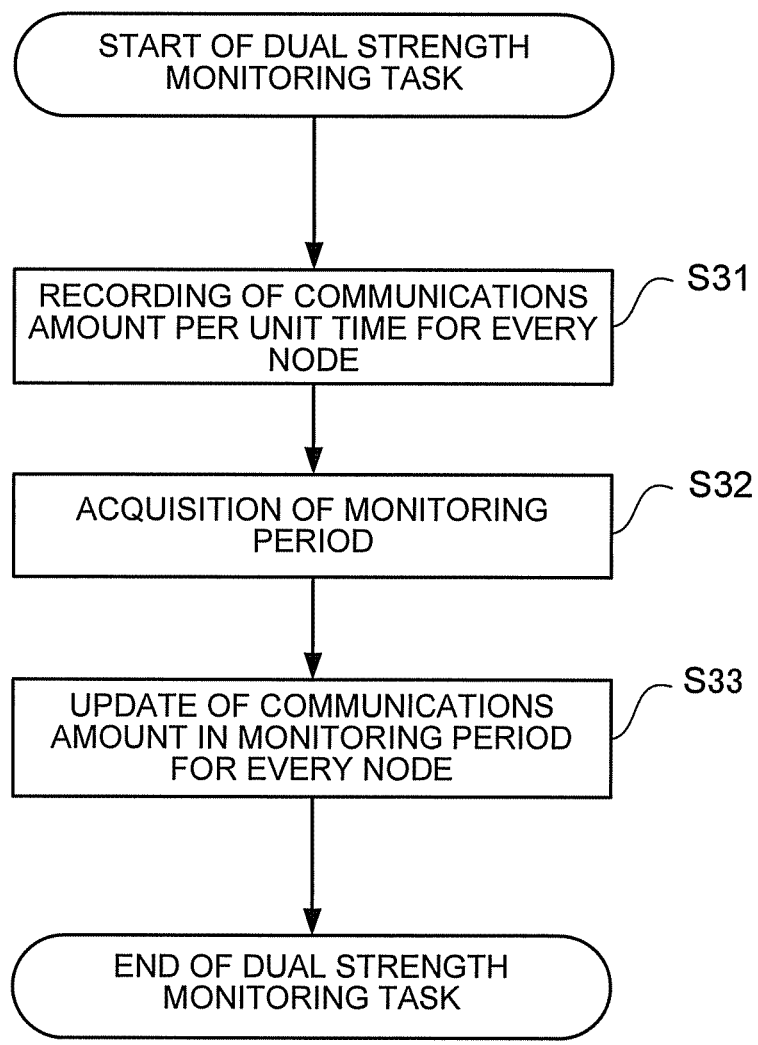
FIG. 10 illustrates a dual strength monitoring task.
Figure 11:
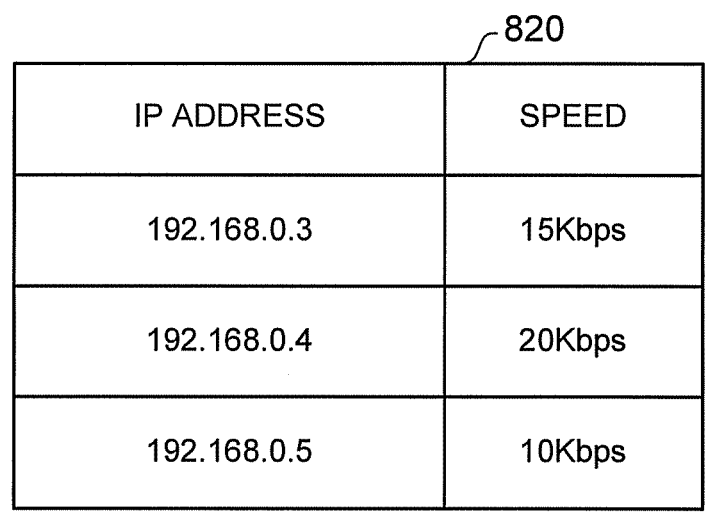
FIG. 11 illustrates an exemplary communications amount table for use with evaluation of dual strength.

FIGS. 10 and 11 illustrate a dual strength monitoring task for finding an index for use to evaluate the dual strength. FIG. 10 illustrates the dual strength monitoring task. The dual strength monitoring task is executed by the server 110. FIG. 11 shows a communications amount table for use with evaluation of the dual strength. FIG. 10 illustrates:

Operation S31: The server 110 records, with a time, the communications amount per unit time, e.g., a second, for every service provider node.

Operation S32: The server 110 acquires a monitoring period, e.g., one hour.

Operation S33: The server 110 compiles the communications amount recorded for every service provider node in operation 831 during the monitoring period, e.g., a second, and records the compilation result in the communications amount table 820 for update. In the communications amount table 820, the speed, i.e., communications speed, with the service provider node with the IP address of 192.168.0.3 is 15 Kbps (bit/second). The speed with the service provider node with the IP address of 192.168.0.4 is 20 Kbps. The speed with the service provider node with the IP address of 192.168.0.5 is 10 Kbps. Accordingly, the larger communications amount indicates the stronger dual strength, and thus the service provider node having the least dual strength with the service provider node under the monitoring of dual strength is the one with the IP address of 192.168.0.5.

The monitoring period may be set longer than the time for software update. Note that, with the node list table 810 of FIG. 9, and with the communications amount table 820 of FIG. 11, in the distribution destination determination task executed in operation S14 of the software distribution task, the service provider node is determined as below for use as a software distribution destination. That is, by referring to the node list table 810, extracted are the service provider nodes with the IP addresses of 192.168.0.4 and 192.168.0.5 (operation S22). A comparison is then made between these service provider nodes with the IP addresses of 192.168.0.4 and 192.168.0.5 in terms of speed, i.e., 20 Kbps and 10 Kbps, thereby evaluating the dual strength. As a result, the service provider node with the IP address of 192.168.0.5 is extracted as showing the dual strength being lower.

Figure 12:
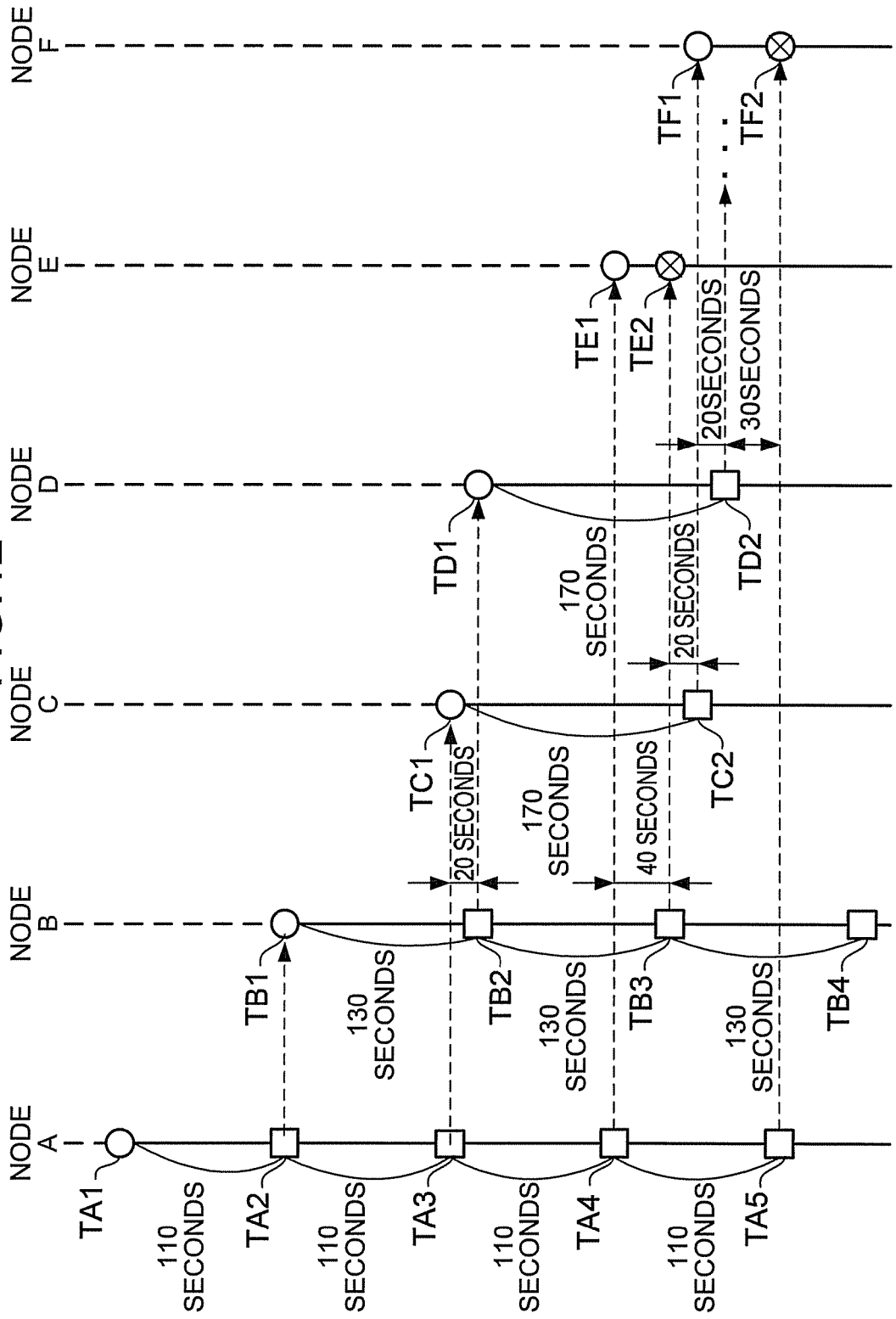
FIG. 12 illustrates how a software update command is transferred.

FIG. 12 illustrates how a software update command may be transferred. Exemplified here is a cluster system including, as service provider nodes, nodes A, B, C, D, E, and F. In FIG. 12, circular marks each denote software update. In real world, it takes time to complete software update after an update command is provided, but for simplicity, a circular mark is used for representation. In FIG. 12, cross-in-circle marks each denote the cancel operation for an update command, and square marks therein each denote the command operation for update. Also in FIG. 12, vertical lines (vertical broken lines) each denote the state in which the server is operating by previous-version software, and vertical lines (vertical solid lines) each denote the state in which the server is operating by new-version software.

The node A performs software update (operation TA1). With the software distribution interval established to 110 seconds, i.e., the standby frequency of 11 and the heartbeat interval of 10 seconds, the node A issues a software update command to the node B with the lapse of 110 seconds after the operation TA1 (operation TA2). At this time, because the node A is set with the distribution frequency of 2 (with the standby frequency of 11), and because this is the distribution for the first time, the node A issues a command to the node B to set a value of 3 to the distribution frequency thereof (and a value of 13 to the standby frequency thereof). The node A then issues a software update command to the node C with the lapse of 110 seconds after the operation TA2 (operation TA3). At this time, because the node A is set with the distribution frequency of 2 (with the standby frequency of 11), and because this is the distribution for the second time, the node A issues a command to the node C to set a value of 4 to the distribution frequency thereof (and a value of 17 to the standby frequency thereof). The node A then issues a software update command to the node E with the lapse of 110 seconds after the operation TA3 (operation TA4). At this time, because the node A is set with the distribution frequency of 2 (with the standby frequency of 11), and because this is the distribution for the third time, the node A issues a command to the node E to set a value of 5 to the distribution frequency thereof (and a value of 19 to the standby frequency thereof). The node A then issues a software update command to the node F with the lapse of 110 seconds after the operation TA4 (operation TA5). At this time, because the node A is set with the distribution frequency of 2 (with the standby frequency of 11), and because this is the distribution for the fourth time, the node A issues a command to the node F to set a value of 6 to the distribution frequency thereof (and a value of 23 to the standby frequency thereof). Thereafter, a software update command is repeatedly issued until there is no more node being a distribution target. As such, the distribution source issues a software update command to any other nodes at regular intervals with a fixed software distribution interval of its own. Moreover, every time a software update command is issued to any other nodes, the distribution source designates various values for the designation frequency to vary the software distribution interval when any of the other nodes becomes a distribution source.

The node B performs software update (operation TB1). With the software distribution interval established to 130 seconds, i.e., the standby frequency of 13 and the heartbeat interval of 10 seconds, the node B issues a software update command to the node D with the lapse of 130 seconds after the operation TB1 (operation TB2). At this time, because the node B is set with the distribution frequency of 3 (with the standby frequency of 13), and because this is the distribution for the first time, the node B issues a command to the node D to set a value of 4 to the distribution frequency thereof (and a value of 17 to the standby frequency thereof). The node B then issues a software update command to the node E with the lapse of 130 seconds after the operation TB2 (operation TB3). At this time, because the node B is set with the distribution frequency of 3 (with the standby frequency of 13), and because this is the distribution for the second time, the node B issues a command to the node E to set a value of 5 to the distribution frequency thereof (and a value of 19 to the standby frequency thereof). The node B then found that there is no more node being a distribution target with the lapse of 130 seconds after the operation TB3, and thus issues no software update command. As such, because the nodes A and B both being a distribution source distributes a software update command at different timings, a time lag is caused between the timings for the software update by the nodes C and D, i.e., a lag of 20 seconds between the operations TA3 and TB2, and a lag of 40 seconds between the operations TA4 and TB3. Such a time lag can eliminate any factor of causing the cluster system to be unstable due to a plurality of nodes, e.g., nodes C and D, performing software update all at once.

Such effects are increased as the distribution generation is succeeded, i.e., next and later generations.

The node C performs software update (operation TC1). With the software distribution interval established to 170 seconds, i.e., the standby frequency of 17 and the heartbeat interval of 10 seconds, the node C issues a software update command to the node F with the lapse of 170 seconds after the operation TC1 (operation TC2). At this time, because the node C is set with the distribution frequency of 4 (with the standby frequency of 17), and because this is the distribution for the first time, the node C issues a command to the node F to set a value of 5 to the distribution frequency thereof (and a value of 19 to the standby frequency thereof).

The node D performs software update (operation TD1). With the software distribution interval established to 170 seconds, i.e., the standby frequency of 17 and the heartbeat interval of 10 seconds, if there is any node left being a distribution target with the lapse of 170 seconds after the operation TD1, the node D issues a software update command thereto (operation TD2). At this time, because the node D is set with the distribution frequency of 4 (with the standby frequency of 17), and because this is the distribution for the first time, the node D issues a command to set a value of 5 to the distribution frequency thereof to the node being the target (and a value of 19 to the standby frequency thereof).

The nodes C and D have the same software distribution interval of 170 seconds, but have a time lag of 20 seconds therebetween. This time lag favorably contributes to vary the software update timing in the cluster system.

The node E performs software update (operation TE1). Even if a software update command is provided in operation TE2, the software update has been already through, and thus the software update command provided by the node B in operation TB3 is neglected.

The node F performs software update (operation TF1). Even if a software update command is provided in operation TF2, the software update has been already through, and thus the software update command provided by the node A in operation TA5 is neglected.

As such, even if a software update command is transferred in the cluster system, a time lag is appropriately caused, thereby being able to avoid any state in which a plurality of nodes (service provider nodes) performs software update all at once in the cluster system.

Figure 14:
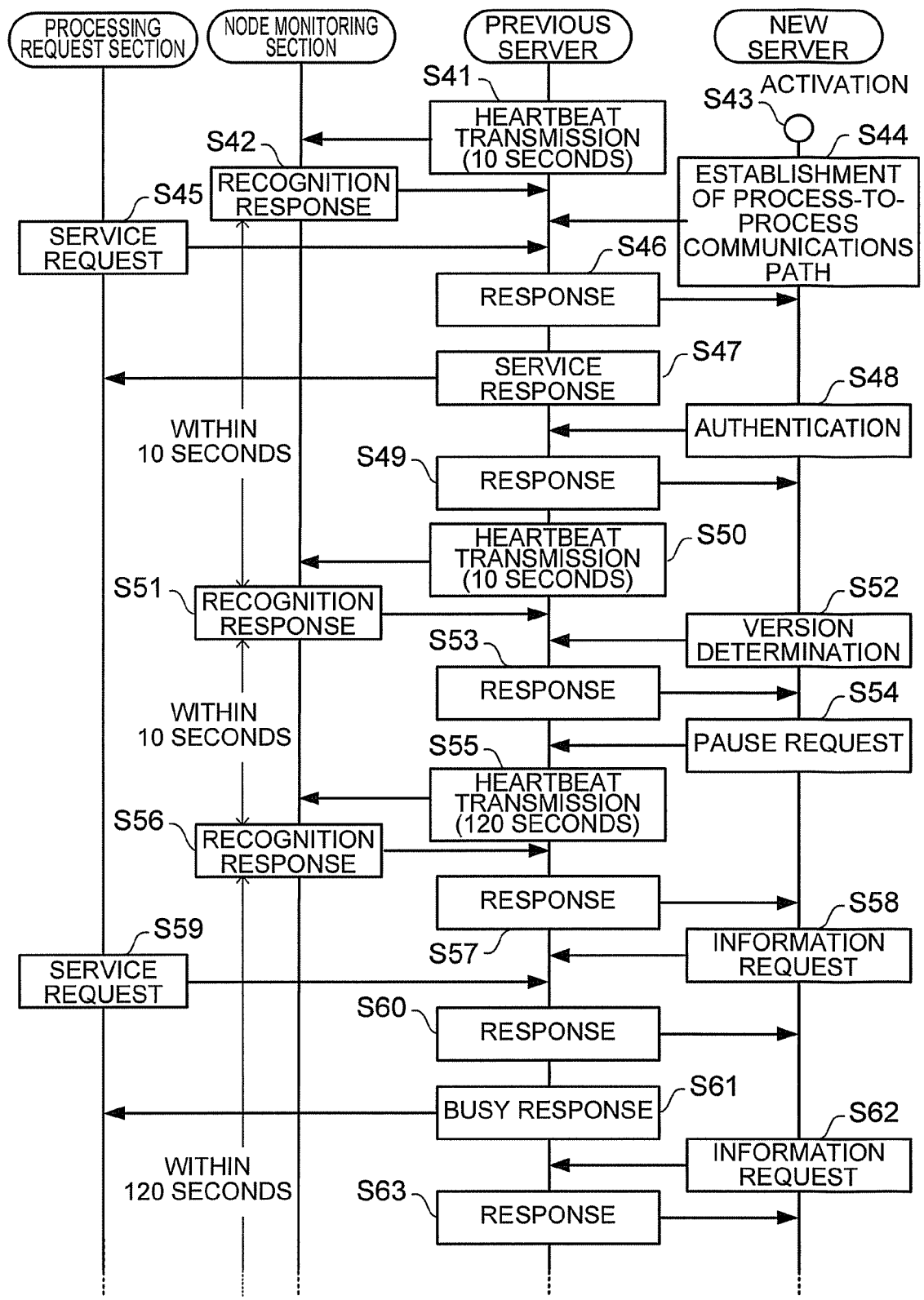
FIG. 14 illustrates an exemplary sequence diagram of a software update task.
Figure 15:
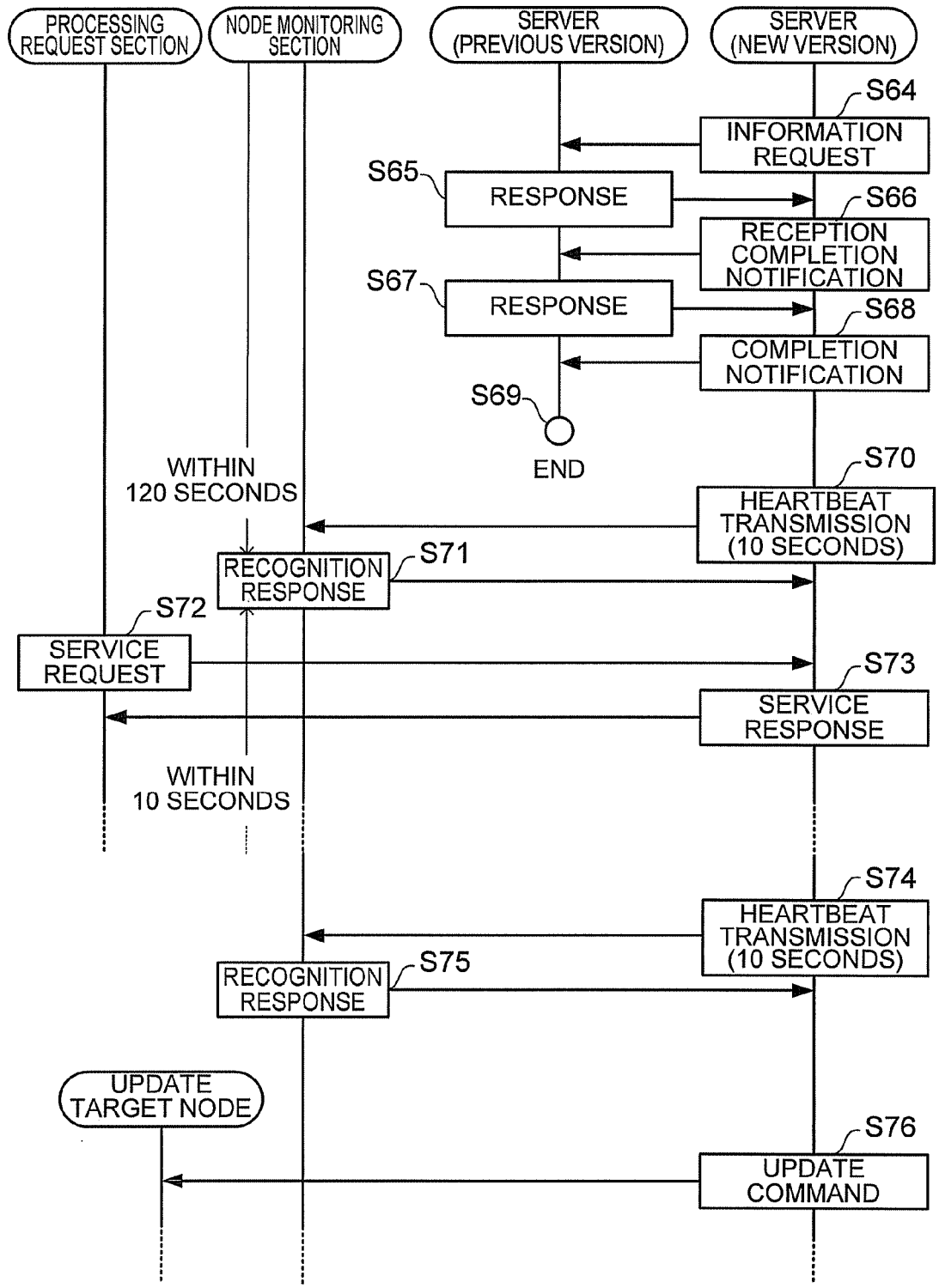
FIG. 15 is another sequence diagram of a software update task.

FIGS. 13, 14, and 15 illustrate a software update (update of server program). FIG. 13 illustrates a decentralized processing system. The service provider node 100 shows the server program during update. For updating the server program, a previous server 110a is activated at the same time as a new server 110b, thereby transferring a server function from the previous server 110a to the new server 110b. This enables to increase the reliability of the system while minimizing the time of stopping the service provision by the server 110.

The previous and new servers 110a and 110b are each a processing function (process) for the provision of service, and are different in version, i.e., previous and new versions. The server function (service) provided by the service provider node 100 is implemented by the service provider node 100 running the server software. FIG. 13 illustrates a state in which the two servers, i.e., the previous and new servers 110a and 110b, are both activated for update of the server software.

The servers 110a and 110b are respectively configured to include service communications processing sections 111a and 111b, service processing sections 112a and 112b, heartbeat communications processing sections 113a and 113b, and process-to-process communications processing sections 114a and 114b.

The service communications processing section 111a or 111b communicates with the processing request node 600 by creating a socket 120a, or if it is already created, via the socket 120a. The service communications processing section 111a or 111b accepts a processing request coming from the processing request node 600, and asks the corresponding service processing section 112a or 112b to execute the service task requested as such. The service communications processing section 111a or 111b forwards, to the processing request node 600, the processing result provided by the corresponding service processing section 112a or 112b.

The service processing sections 112a and 112b respectively execute the service task requested to the service communications processing sections 111a and 111b, and forward the processing result as a response to the service communications processing sections 111a and 111b, respectively.

The heartbeat communications processing sections 113a and 113b each create a socket 120b, and forward the heartbeat packet 150 to the monitoring node 500 at regular intervals. Note here that the heartbeat communications processing sections 113a and 113b each provide information in the heartbeat packet 150. The information here is about the transmission interval of the heartbeats, i.e., heartbeat interval information, whereby the monitoring node 500 is notified of the current transmission interval of the heartbeats. The transmission interval of the heartbeat packet 150 is defined in initial state in advance, and can be changed in accordance with any requirements.

The process-to-process communications processing sections 114a and 114b perform process-to-process communications by creating sockets 120c and 120d, respectively. The process-to-process communications processing sections 114a and 114b each perform transmission and reception of data needed for switching from the previous server 110a to the new server 110b through the process-to-process communications. When the transmission and reception of data as such is completed, the process-to-process communications processing sections 114a and 114b each switch the server function from the previous server 110a to the new server 110b, thereby stopping the previous server 110a to operate. As such, in the state in which either the server 110a or 110b is ready for a response with respect to any device connected over the network, i.e., the communications path is reserved, the data is passed from the previous server 110a to the new server 110b.

The service provider node 100 activates the new server 110b in accordance with a command, i.e., update command, coming from an update command section 720. The update command section 720 forwards, in response to an operation input by a manager, a request for software update to the service provider node 100. The server software of the new server 110b, i.e., update program, is distributed from an update file storage section 710 to the service provider node 100.

For transmission of such a software update request, alternatively, the update command section 720 may acquire the update program from the update file storage section 710 for transmission to the service provider node 100 together with the software update request, or may transmit the update program in advance before the software update request. Alternatively, the update program may be read by the service provider node 100 via a portable recording medium, or may be stored in advance in an HDD in the service provider node 100 as a program to be updated.

The monitoring node 500 includes a server operation information storage section 510, and a node monitoring section 520. The server operation information storage section 510 stores therein server operation information, which is a data table for management use to see whether the servers equipped in the service provider nodes 100, 200, 300, and 400 are each being in operation or not. The server operation information storage section 510 is a part of the storage area of the RAM 502, for example.

The processing request node 600 includes a processing request section 610. The processing request section 610 forwards, over the network 50, processing requests coming from the terminal devices 51 to 53 to any of the corresponding service provider nodes 100, 200, 300, and 400. For example, the processing request node 600 acquires information about a load from each of the service provider nodes 100, 200, 300, and 400, and forwards a processing request to any of the service provider nodes with a lighter load. When a response comes from the service provider node to which the processing request is directed, the processing request section 610 forwards the response to the terminal device from which the processing request is provided.

The management node 700 includes the update file storage section 710, and the update command section 720. The update file storage section 710 stores therein a program file (update file) for use to update the servers 110. For example, the update file storage section 710 is a part of the storage area of the hard disk drive of the management node 700, for example.

Note here that the process-to-process communications are surely not restricted to use the socket as above, and may use file mapping or pipe, for example. FIGS. 14 and 15 illustrate a software update task. The task operations of FIGS. 14 and 15 are described in order of operation number.

Operation S41: While the server 110*a*, i.e., previous server, is being activated, the heartbeat communications processing section 113*a* in the server 110*a* of the service provider node 100 transmits the heartbeat packet 150 at the heartbeat transmission interval of a default value set in advance. The heartbeat transmission interval herein is exemplified as being 10 seconds.

Operation S42: The node monitoring section 520 of the monitoring node 500 acquires the heartbeat packet 150, thereby checking whether the server 110*a* is operating normally or not. The node monitoring section 520 then sets the current time in the server operation information storage section 510, i.e., in the field for the heartbeat acquisition time corresponding to the server 110*a*. The node monitoring section 520 then forwards the heartbeat recognition response packet 160 to the server 110*a* as a recognition response.

As such, the server 110*a* of the service provider node 100 can keep track of information about the other service provider nodes 200, 300, and 400 in the cluster system, i.e., about the address, state, and VER thereof.

Operation S43: The service provider node 100 activates the server 110*b*, i.e., new server. The server 110*b* can be activated based on a command coming from the update command section 720 of the management node 700. The server 110*b* can be also activated through remote operation or others by a timer or an operator.

Operation S44: The process-to-process communications processing section 114*b* of the server 110*b* creates a socket 120*d*, thereby establishing a process-to-process communications path with a socket 120*c* created by the server 110*a*. Establishing the process-to-process communications path is implemented by, with the server 110*b* knowing which component the server 110*a* is communicating, creating the socket 120*c* for such information about the component the server 110*a* is communicating, i.e., communications component information, and then by waiting for a connection of the server 110*b*. The process-to-process communications processing section 114*b* thus communicates with the process-to-process communications processing section 114*a*.

Operation S45: The processing request section 610 of the processing request node 600 transmits a service request, i.e., processing request, issued by any of the terminal devices to the service provider node 100. At this time, as a port number of the transmission destination for the service request, designated is the number of a port established in the server 110*a*. The service communications processing section 111*a* in the server 110*a* of the service provider node 100 is then provided with the service request coming from the processing request node 600 as such.

Operation S46: The process-to-process communications processing section 114*a* of the server 110*a* makes a response to a request coming from the server 110*b*, i.e., request for establishing the process-to-process communications path. Note here that the response against such a request for establishing the process-to-process communications path is not made after a wait for the service request in operation S45. The response is made with no delay, merely indicating that the service request of operation S45 occurs like an event.

Operation S47: In response to the service request in operation S45, the service communications processing section 111*a* of the server 110*a* checks first whether the server 110*a* is in the state of "normal" for provision of service, and then asks the service processing section 112*a* to go through the provided service request. The service communications processing section 111*a* then transmits, to the processing request section 610, the service response, i.e., processing result, provided by the service processing section 112*a*. After receiving the response as such, the processing request section 610 forwards the processing result found in the response to the terminal device.

Note here that the server 110 can be in the state of, for provision of service, "normal" in which the provision of service is possible, "pause" in which the provision of service is temporarily stopped, and "end" in which the provision of service is ended. When the server 110 is in the state of "normal", a service request is accepted, and a response is made to the service request. When the server 110 is in the state of "pause", a request for service is accepted, but a response to any effective service is not made. When the server 110 is in the state of "end", a request for service is not accepted, and a response is not made to the service request.

Operation S48: After receiving the response that the process-to-process communications path is established, the process-to-process communications processing section 114*b* of the server 110*b* makes a request for authentication to the server 110*a*. For making such a request for authentication, the process-to-process communications processing section 114*b* forwards any specific information with which the correctness of the server 110*b* can be checked. Such specific information includes text string, number sequence, specific code, and others.

Operation S49: The process-to-process communications processing section 114*a* of the server 110*a* makes a response to the authentication request from the server 110*b*. The process-to-process communications processing section 114*a* checks the specific information provided at the time of the authentication request to verify the correctness, i.e., whether the server 110*b* is correct for the server 110*a* to pass the server function.

Operation S50: The heartbeat communications processing section 113*a* of the server 110*a* transmits the heartbeat packet 150 at the heartbeat transmission interval.

Operation S51: The node monitoring section 520 acquires the heartbeat packet 150 to check whether the servers 110 are operating normally or not. The node monitoring section 520 also updates the information corresponding to the servers 110 in the server operation information storage section 510. The node monitoring section 520 then forwards, to the server 110*a*, the heartbeat recognition response packet 160 as a recognition response.

Operation S52: After receiving the response to the authentication, the process-to-process communications processing section 114*b* of the server 110*b* asks the server 110*a* to make a version determination. For making such a request for version determination, the server 110*a* transmits version information for use to check whether such version update is allowed or not. The version information includes additional information about the version (the number of version) of the server 110*b*, a number sequence for use of comparison which version is the latest, and the restrictions on version update, for example.

Operation S53: The process-to-process communications processing section 114*a* of the server 110*a* makes a response to the version determination request coming from the server 110*b*, i.e., verifies the version information provided with the version determination request to determine whether the version update is allowed or not, and forwards back the result.

Operation S54: When the provided response tells that the version update is allowed, the process-to-process communications processing section 114*b* of the server 110*b* asks the server 110*a* to pause the server function.

Operation S55: In response to the request coming from the server 110*b* to pause the service function, the heartbeat communications processing section 113*a* of the server 110*a* transmits the heartbeat packet 150 at the heartbeat transmission interval, which is a time value set as being sufficient for software update. The heartbeat transmission interval is assumed as being set to 120 seconds. This is to provide enough time for making ready the passing of the server function from the server 110*a* to the server 110*b*, and to notify the node monitoring section 520 that the server 110*a* is being activated. Upon reception of such a pause request, the server 110*a* accordingly pauses the provision of service.

Operation S56: The node monitoring section 520 acquires the heartbeat packet 150 to check whether the servers 110 are operating normally or not. The node monitoring section 520 also updates the information in the server operation information storage section 510 corresponding to the servers 110. At this time, to the field of the heartbeat interval information in the server operation information storage section 510 corresponding to the servers 110, the heartbeat transmission interval of 120 seconds is set. The node monitoring section 520 then forwards, to the server 110*a*, the heartbeat recognition response packet 160 as a recognition response.

Operation S57: The process-to-process communications processing section 114*a* of the server 110*a* makes a response to the pause request from the server 110*b*. The response to the pause request is made after the provision of service is temporarily stopped. When the service request is provided earlier than the pause request, the service response is made first before the provision of service is temporarily stopped. When the service request is accepted later than the pause request (operation S59), the process-to-process communications processing section 114*a* makes a BUSY response, i.e., response of insufficient resources (operation S61). By making the BUSY response as such, a notification is made that the server function is not stopped, thereby not requiring troubleshooting that is necessary once the server is stopped in operation. Upon reception of the BUSY response, the processing request section 610 transmits again the service request after the lapse of a predetermined length of time, e.g., random time.

Operation S58: After receiving the response to the pause request, the process-to-process communications processing section 114*b* of the server 110*b* asks for information needed to pass the server function to the server 110*a*. The information includes various types of information, e.g., information for use to provide various types of service, information for use to perform heartbeat communications, and management information about the server software. Such information is requested repeatedly for a required number of times by a predetermined unit, e.g., data item, and data amount (operations S62 and S64).

Operation S60: The process-to-process communications processing section 114*a* of the server 110*a* forwards as a response the information asked by the server 110*b*. Such a response is made every time a request comes (operations S63 and S65).

Operation S66: When determining that any needed information is completely acquired based on the response about the acquisition of information, the process-to-process communications processing section 114*b* of the server 110*b* notifies the completion of reception by issuing a reception completion notification.

Operation S67: The process-to-process communications processing section 114*a* of the server 110*a* makes a response of YES to the reception completion notification.

Operation S68: When receiving the response to the reception completion notification, the process-to-process communications processing section 114*b* of the server 110*b* transmits a completion notification indicating that the task is now completed for passing the server function. Thereafter, the server 110*b* is provided with the server function from the server 110*a*, and offers the server function as the server 110. The service communications processing section 111*b* in the server 110*b* of the service provider node 100 is provided with a service request from the processing request node 600.

Operation S69: The process-to-process communications processing section 114*a* of the server 110*a* is provided with the completion notification. In response to the completion notification, the process of offering the server function is ended for the server 110*a*.

As such, the function-pass task for the server function is completed by three levels of handshaking, thereby being able to increase the reliability of the passing of the server function.

Operation S70: In response to the completion of the function-pass task for the server function, the heartbeat communications processing section 113*b* of the server 110*b* transmits the heartbeat packet 150 at the heartbeat transmission interval of a default value. At this time, the heartbeat transmission interval is assumed as being 10 seconds. Because the software update is completed as such, to the field of "application identification number" of the heartbeat packet 150, the identification number of the software after the update is set.

Operation S71: The node monitoring section 520 acquires the heartbeat packet 150 to check whether the servers 110 are operating normally or not. The node monitoring section 520 also updates information in the server operation information storage section 510 corresponding to the servers 110. At this time, to the field of the heartbeat interval information in the server operation information storage section 510 corresponding to the servers 110, the heartbeat transmission interval of 10 seconds is set. The node monitoring section 520 then forwards, to the server 110*b*, the heartbeat recognition response packet 160 as a recognition response. As such, the remaining service provider nodes can know that the server program of the service provider node 100 is now updated. The server 110*b* then starts the software distribution task of FIG. 6. Thereafter, the server 110*b* waits for distribution of software during the transmission of the heartbeat packet 150 for as often as the standby frequency (operation S13 of FIG. 6).

Operation S72: The processing request section 610 of the processing request node 600 transmits the service request issued by the terminal device to the service provider node 100. The service request is received by, in the service provider node 100, the service communications processing section 111b in the server 110b.

Operation S73: In response to the service request of operation 872, the service communications processing section 111b of the server 110b checks whether the state for provision service is "normal" or not. After the completion of such a check, the service communications processing section 111b asks the service processing section 112b to go through the provided service request. The service communications processing section 111b then forwards the service response, i.e., the processing result, provided by the service processing section 112b to the processing request section 610. After receiving the response, the processing request section 610 forwards the processing result found in the response to the terminal device.

Note here that, in FIG. 15, after operation S73, the procedure goes to operation S74 without going through the heartbeat communications for a predetermined number of times, and communications for recognition response (not shown).

Operation S74: The heartbeat communications processing section 113b of the server 110b forwards the heartbeat packet 150 at the heartbeat transmission interval set to a value of default.

Operation S75: Through acquisition of the heartbeat packet 150, the node monitoring section 520 checks whether the server 110b is operating normally or not, and updates information corresponding to the server 110b in the server operation information storage section 510. At this time, the field of heartbeat interval information in the server operation information storage section 510 corresponding to the server 110 is set with the heartbeat transmission interval of 10 seconds. The node monitoring section 520 then transmits the heartbeat recognition response packet 160 to the server 110b as a recognition response.

Operation S76: When there is any other destination of software distribution, the server 110b accordingly distributes the software to such an update target node after the lapse of the standby time (operation S16 of FIG. 6). With the process-to-process communications as such, any information needed for the passing of server function is transmitted from the server 110a to the server 110b. Also with the BUSY response during the function-pass task for the server function, the processing request section 610 is notified that the server function is not stopped. The insufficiency of resources, i.e., communications resources, memory resources, and CPU time, is expected to be solved after a predetermined length of time unlike a hardware or software failure in the service provider node 100. Accordingly, after receiving the response of the insufficient resources, the processing request section 610 again requests processing. When the insufficiency of resources is not resolved even if such a request is made many times, the processing request section 610 generally executes an error task. As such, the BUSY response during the passing of the server function serves to prevent the execution of the error task with respect to an error that is not actually occurred. The error determination can be improved in accuracy, thereby being able to restrict any margin for determination requirements to avoid any wrong error determination, and is a contributing factor for the error determination with more swiftness.

Also the node monitoring section 520 is notified that the server function is not stopped by changing the transmission interval of the heartbeat communications, and by passing the server function from the transmission source, i.e., the heartbeat communications processing section 113a, to the heartbeat communications processing section 113b, thereby preventing any unnecessary troubleshooting.

The server 110a is run by any existing software, and is a target server for software update. The server 110a is actually providing the service in the service provider node 100. The server 110b may be run by a new version of software, and is provided with the server function from any existing server in the service provider node 100.

The new version of software may be a result of enhancing, updating, and/or correcting any existing software, for example, and the resulting software is managed by number of version. The software managed by number of version as such has a function of transferring any information needed for passing the server function from the previous version to the new version, i.e., passing from the previous to the new process. Such information transfer by the process-to-process communications allows an access to any same resources, e.g., communications resources, and memory resources.

A modified example of the index used for evaluating the dual strength is described and referring to FIG. 11. FIG. 16 is a communications amount table for use to evaluate the dual strength. In the communications amount table 820 of FIG. 11, the communications amount is recorded by the speed per unit time. In the communications amount table 830 of FIG. 16, on the other hand, the communications amount is recorded by the communications frequency per unit time. The table of FIG. 16 is considered advantageous when the communications line has a large capacity, and when the degree of communications frequency is considered more preferable for evaluation of dual strength than the level of communications speed.

With the node list table 810 of FIG. 9, and with the communications amount table 830 of FIG. 16, in the distribution destination determination task to be executed in operation 814 in the software distribution task, a software distribution destination, i.e., service provider node, is determined as below. From the node list table 810, extracted are the two service provider nodes with the IP addresses of 192.168.0.4 and 192.168.0.5 (operation S22). A comparison is made between these two service provider nodes with the IP addresses of 192.168.0.4 and 192.168.0.5 in terms of frequency, i.e., 30 times/time and 20 times/time, thereby evaluating the dual strength. As a result, the service provider node with the IP address of 192.168.0.5 is extracted as showing a lower value for the dual strength.

Figure 17:
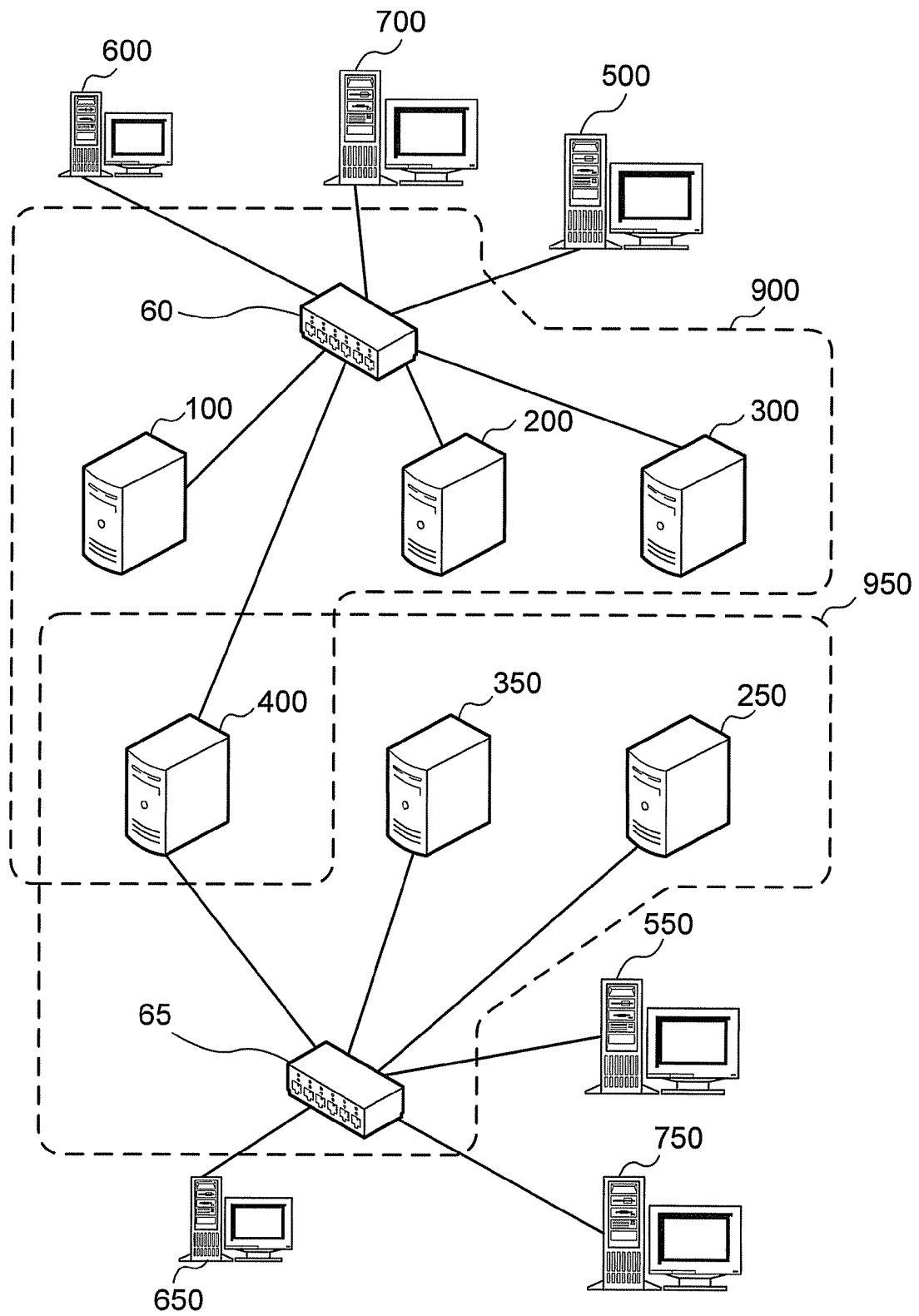
FIG. 17 illustrates a modified example of the configuration of the cluster system of the embodiment.

FIG. 17 illustrates another exemplary configuration of a cluster system FIG. 18 illustrates an exemplary node list table, and FIG. 19 illustrates an exemplary overall node list table.

In another exemplary embodiment of the cluster system, via the switch 60, a cluster 900 configured by a plurality of service provider nodes 100, 200, 300, and 400 is connected with the components, i.e., the monitoring node 500, the processing request node 600, and the management node 700. Also, via a switch 65, a cluster 950 configured by a plurality of service provider nodes 250, 350, and 400 is connected with components, i.e., a monitoring node 550, a processing request node 650, and a management node 750. The service provider node 400 is provided both in the clusters 900 and 950.

The monitoring node 500 monitors a plurality of service provider nodes 100, 200, 300, and 400 configuring the cluster 900. The monitoring node 500 receives the heartbeat packet 150 respectively from the service provider nodes 100, 200, 300, and 400, and forwards the heartbeat recognition response packet 160 corresponding to the cluster 900.

The monitoring node 550 monitors a plurality of service provider nodes 250, 350, and 400 configuring the cluster 950. The monitoring node 550 receives the heartbeat packet 150 from the service provider nodes 250, 350, and 400, and forwards the heartbeat recognition response packet 160 corresponding to the cluster 950.

As is provided in both the clusters 900 and 950, the service provider node 400 forwards the heartbeat packet 150 both to the monitoring nodes 500 and 550, and is provided with the heartbeat recognition response packet 160 from each of the monitoring nodes 500 and 550.

Based on the heartbeat recognition response packet 160 provided by the monitoring node 500, the service provider node 400 acquires the node list table 810 of FIG. 9. The service provider node 400 also acquires a node list table 840 of FIG. 18 based on the heartbeat recognition response packet 160 provided by the monitoring node 550. After acquiring the two node list tables 810 and 840 as such, the service provider node 400 acquires an overall node list table 850 being a combination of these two node list tables 810 and 840. The service provider node 400 then extracts any software update target based on the overall node list table 850.

In a system in which any specific node is included in a plurality of clusters, a task of software update is performed in both the clusters. An embodiment disclosed includes where an update target selection unit selects one service provider node as a software update target. This is not restrictive, and two or more service provider nodes can be each selected as a software update target. If this is the case, in order to avoid any state in which a plurality of nodes are in the software update task all at once in the cluster system, it is desirable to increase a time lag for the command timing of a software update command to be larger than that in the case where the software update target is one service provider node. Similarly, it is may be desirable to increase a difference between the first and second update timing information to be larger than that in the case where the software update target is one service provider node, and to generate the second update timing information.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Such a computer-readable recording medium includes a magnetic recording device, an optical disk, a magneto-optic recording medium, a semiconductor memory, and others. The magnetic recording device is exemplified by a hard disk drive (HDD), a flexible disk (FD), a magnetic tape, and others. The optical disk is exemplified by a DVD (Digital Versatile Disc), a DVD-RAM (Random-Access Memory), CD-ROM (Compact Disc Read-Only Memory), CD-R (Recordable)/RW (Rewritable), and others. The magneto-optic recording medium is exemplified by MO (Magneto-Optical Disk).

For distributing the program, a portable recording medium such as DVD and CD-ROM recorded with the program can be put on sale. Alternatively, the program may be stored in a storage device of a server computer, and the program may be transferred from the server computer to any other computer over a network.

A computer running the program can store, in its own storage device, a program recorded on a portable recording medium or a program provided by a server computer. The computer reads the program from the storage device of its own, and goes though process execution in accordance with the program. Alternatively, the computer may directly read the program from the portable recording medium, and go through process execution in accordance with the program. The computer also can, every time any new program is provided from the server computer, successively go through process execution in accordance with the provided program.

An example of communication media includes a carrier-wave signal. Further, according to an aspect of the embodiments, any combinations of the described features, functions and/or operations can be provided. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A non-transitory computer-readable recording medium storing a software update command program that causes a computer connected to a plurality of service provider nodes in a cluster system over a network to transmit an update command of a service provider program with respect to the service provider nodes, the software update command program causing the computer to execute:

transmitting a program information about the service provider program being executed by the computer, at predetermined transmission interval, to a monitoring node that monitors the cluster system;

receiving a node list information including the program information of the service provider nodes from the monitoring node;

selecting an update target which of the service provider nodes are not yet updated with the service provider program by referring to the program information in the node list information, and selecting, as the update target service provider node, at least one of the service provider nodes not yet updated with the service provider program;

determining a command timing in response to an input of first update timing information together with the update command with respect to the service provider program being executed by the computer, wherein a time after a lapse of a standby time found in the first update timing information is set as the command timing of the update command where the first update timing information indicating the standby time until the update command is transferred;

generating a second update timing information indicating a standby time until the update command is transferred from the update target service provider node to any of the other of the service provider nodes; and command-transmitting an update command, when the command timing comes, transmitting the update command of the service provider program and the second update timing information to the update target service provider node.

2. The computer-readable recording medium according to claim 1,
wherein the transmitting procedure includes the program information in a heartbeat indicating that the computer provides a service based on the service provider program, and transmits the heartbeat.

3. The computer-readable recording medium according to claim 2,
wherein the receiving procedure receives the node list information found in a recognition response to the heartbeat provided by the monitoring node.

4. The computer-readable recording medium according to claim 1,
wherein the selecting procedure selects, as the update target service provider node, the service provider node having a relationship not that much relevant to the computer.

5. The computer-readable recording medium according to claim 4,
wherein the relationship is evaluated by a previous communications history between the service provider nodes.

6. The computer-readable recording medium according to claim 4,
wherein the relationship is evaluated by a previous communications amount per unit time between the service provider nodes.

7. The computer-readable recording medium according to claim 4,
wherein the relationship is evaluated by a previous communications frequency in per unit time between the service provider nodes.

8. The computer-readable recording medium according to claim 1,
wherein the generating procedure generates the second update timing information designated with a standby time different from that of the first update timing information.

9. The computer-readable recording medium according to claim 8,
wherein the second update timing information is a coefficient value, and the standby time is designated by multiplying a predetermined unit time and the coefficient value.

10. The computer-readable recording medium according to claim 9,
wherein the coefficient value takes a prime number.

11. The computer-readable medium according to claim 1,
wherein the transmitting procedure includes the program information in a heartbeat indicating that the computer provides a service based on the service provider program, and transmits the heartbeat,
wherein the generating procedure generates the second update timing information designated with a standby time difference from that of the first update timing information, and
wherein the second update timing information is a coefficient value, and the standby time is designated by multiplying a transmission interval of the heartbeat and the coefficient value.

12. The computer-readable medium according to claim 1,
wherein the generating procedure generates the second update timing information designated with the standby time longer than the standby time designated in the first update timing information.

13. The computer-readable medium according to claim 1,
wherein the command-transmitting procedure distributes an update program for use to update the service provider program in response to the update command.

14. The computer-readable medium according to claim 1,
wherein the selecting procedure selects, when the computer is provided to a plurality of cluster systems, the update target service provider node based on overall node list information being a combination of a plurality of node list information pieces provided by the monitoring node in each of the cluster systems.

15. A software update command method for transmitting an update command for a service provider program with respect to the service provider nodes, by a computer connected to a plurality of service provider nodes in a cluster system over a network, the method executed by the computer comprising:
transmitting, at predetermined transmission interval, to a monitoring node that monitors the cluster system, program information of the service provider program being executed by the computer;
receiving, by the computer, node list information including the program information about the service provider nodes from the monitoring node;
determining which of the service provider nodes are not yet updated with the service provider program by referring to the program information in the node list information, and selecting, as an update target service provider node, at least one of the service provider nodes not yet updated with the service provider program;
determining, in response to an input of first update timing information together with the update command with respect to the service provider program being executed by the computer, a time after a lapse of a standby time found in the first update timing information as a command timing of the update command where the first update timing information indicating the standby time until the update command is transferred;
generating second update timing information indicating a standby time until the update command is transferred from the update target service provider node to any of the other of the service provider nodes; and
transmitting, when the command timing comes, the update command of the service provider program and the second update timing information to the update target service provider node.

16. An information processing device that provides service by executing a service provider program in a cluster system, the device comprising:
a memory configured to store a program; and
a processor, based on the program, configured to
transmit, at a given transmission interval, to a monitoring node that monitors the cluster system, program information for the service provider program being executed by the information processing device;
receive, from the monitoring node, node list information including the program information of other information processing devices in the cluster system;
determine which of the other information processing devices which are not yet updated with the service provider program by referring to the program information in the node list information, and selecting, as the update target information processing device, at least one of the other information processing devices not yet updated with the service provider program;
determine, in response to an input of first update timing information together with the update command with respect to the service provider program being executed by the information processing device, a time after a lapse of a standby time found in the first update timing information as the command timing of the update command where the first update timing information indicating the standby time until the update command is transferred;
generate second update timing information indicating a standby time until the update command is transferred from the update target information processing device to any of the other of the information processing devices; and
when the command timing comes, transmits the update command of the service provider program and the second update timing information to the update target information processing device.

* * * * *